(12) United States Patent
Dent

(10) Patent No.: US 7,711,764 B2
(45) Date of Patent: May 4, 2010

(54) PIPELINED REAL OR COMPLEX ALU

(75) Inventor: Paul Wilkinson Dent, Pittsboro, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1080 days.

(21) Appl. No.: 11/142,485

(22) Filed: Jun. 1, 2005

(65) Prior Publication Data

US 2005/0273481 A1 Dec. 8, 2005

Related U.S. Application Data

(60) Provisional application No. 60/577,386, filed on Jun. 4, 2004, provisional application No. 60/643,259, filed on Jan. 12, 2005.

(51) Int. Cl.
*G06F 15/00* (2006.01)
(52) U.S. Cl. ..................................... 708/517
(58) Field of Classification Search ................ 708/512, 708/517
See application file for complete search history.

(56) References Cited

U.S. PATENT DOCUMENTS

| 4,626,825 | A | | 12/1986 | Burleson et al. |
| 4,727,508 | A | * | 2/1988 | Williams ............... 708/670 |
| 4,737,925 | A | * | 4/1988 | Williams ............... 708/670 |
| 5,048,059 | A | | 9/1991 | Dent |
| 5,070,303 | A | | 12/1991 | Dent |
| 5,148,373 | A | | 9/1992 | Dent |
| 5,337,266 | A | * | 8/1994 | Arnold .................. 708/517 |
| 5,944,774 | A | | 8/1999 | Dent |
| 6,711,596 | B1 | | 3/2004 | Coleman |

OTHER PUBLICATIONS

Coleman, J.N. et al., "Arithmetic on the European Logarithmic Microprocessor," IEEE Transactions on Computers, Jul. 2000, pp. 702-715, vol. 49, No. 7.

Lewis, David, "Interleaved Memory Function Interpolators with Application to an Accurate LNS Arithmetic Unit," IEEE Transactions on Computers, Aug. 1994, pp. 974-982, vol. 43, No. 8.

Lewis, David, "An Architecture for Addition and Subtraction of Long Word Length Numbers in the Logarithmic Number System," IEEE Transactions on Computers, Nov. 1990, pp. 1325-1336, vol. 39, No. 11.

(Continued)

*Primary Examiner*—Chuong D Ngo
(74) *Attorney, Agent, or Firm*—Coats & Bennett, P.L.L.C.

(57) ABSTRACT

A method and ALU for implementing logarithmic arithmetic in a multi-stage pipeline is described herein. According to one embodiment, a master function is decomposed into two or more sub-functions. Memory associated with the pipeline stores a look-up table for each stage of the pipeline, where each table represents function values generated based on the corresponding sub-function, and where the look-up table associated with one stage differs from the look-up table(s) associated with at least one other stage. Each stage computes a stage output based on the stage input and the corresponding look-up table. By combining the stage outputs, the multi-stage pipeline outputs the logarithmic arithmetic output.

52 Claims, 9 Drawing Sheets

OTHER PUBLICATIONS

Kingsbury, N.G. et al., "Digital Filtering Using Logarithmic Arithmetic," Electronic Letters, Jan. 28, 1971, vol. 7, No. 1.

Chichyang Chen et al., "Pipelined Computation of LNS Addition/Subtraction with Very Small Lookup Tables," Oct. 5, 1998, pp. 292-297, XP010310302.

Arnold M G et al. Institute of Electrical and Electronics Engineers, "Arithmetic Co-Transformations in the Real and Complex Logarithmic Number Systems," Jul. 6, 1997, pp. 190-199, XP010241209.

Huang S-C et al., "A 32-Bit Logarithmic Number System Processor," Journal of VLSI Processing Systems for Signal, Image, and Video Technology, Dec. 1996, pp. 311-319, XP000636619.

\* cited by examiner

| SIGN BIT | 8-BIT EXPONENT POWER OF 2 OFFSET BY +127 | 23-BIT MANTISSA WITH LEADING "1." IMPLIED AND OMITTED |
|---|---|---|

VALUE RANGE
$\mp 2^{+129}$ TO $2^{-127}$
6.81e38 TO 5.87e-39
(+776dBs TO -746dBs)

IEEE FORMAT: THE NUMBER EQUALS $2^{\text{exponent}-127}$ x SIGN x (1.MANTISSA)

[ THE SUPPRESSED LEADING 1 IS NOT ADDED BACK IF THE WORD IS 32 ZEROS THEREBY "FAKING" A TRUE ZERO ]

| SIGN BIT | 7-BIT EXPONENT POWER OF e OFFSET BY +64 | 24-BIT MANTISSA = FRACTIONAL PART OF $\text{LOG}_e$ OF THE VALUE |
|---|---|---|

VALUE RANGE
$\mp e^{+64}$ TO $e^{+64}$
(+556dBs TO -556dBs)

LOG TO THE BASE e: THE NUMBER EQUALS SIGN x $e^{\text{exponent.mantissa}-63}$

| SIGN BIT | 8-BIT EXPONENT POWER OF 2 OFFSET BY +127 | 23-BIT MANTISSA = FRACTIONAL PART OF $\text{LOG}_2$ OF THE VALUE |
|---|---|---|

VALUE RANGE
$\mp 2^{+129}$ TO $2^{-127}$
(+776dBs TO -746dBs)

BASE 2 LOG FORMAT: THE NUMBER EQUALS SIGN x $2^{\text{exponent.mantissa}-127}$
THE ALL ZEROS PATTERN CAN BE DEFINED TO BE A "FAKE ZERO" IF DESIRED

FIG. 2

PIPELINED REAL OR COMPLEX ALU

RELATED APPLICATIONS

This application claims priority to Provisional U.S. Patent Applications 60/577,386 filed Jun. 4, 2004, and 60/643,259 filed Jan. 12, 2005, which are incorporated herein by reference.

BACKGROUND OF THE INVENTION

The present invention relates generally to computing and digital signal processing, and more particularly to pipelined logarithmic arithmetic in an arithmetic logic unit (ALU).

ALUs have traditionally been used to implement various arithmetic functions, such as addition, subtraction, multiplication, division, etc., on real and/or complex numbers. Conventional systems use either fixed-point or floating-point number ALUs. ALUs using real logarithmic of limited precision are also known. For example, see "Digital filtering using logarithmic arithmetic" (N. G. Kingsbury and P. J. W. Rayner, Electron. Lett. (Jan. 28, 1971), Vol. 7, No. 2, pp. 56-58). "Arithmetic on the European Logarithmic Microprocessor" (J. N. Coleman, E. I. Chester, C. I. Softley and J. Kadlec, (July 2000) IEEE Trans. Comput., Vol. 49, No. 7, pp. 702-715) provides another example of a high precision (32-bit) logarithmic unit for real numbers.

Fixed-point programming presents the programmer with the onus of mentally keeping track of the location of the decimal point, particularly after multiplication or division operations. For example, suppose an FIR filter involves weighted addition of signal samples using weighting factors of −0.607, 1.035, −0.607 . . . , which must be specified to 1 part in 1000 accuracy. In fixed-point arithmetic, it is necessary to represent 1.035 by 1035, for example. As a result, multiplication of a signal sample by this number expands the wordlength of the result by 10 bits. It order to store the result in the same memory wordlength, it is then necessary to discard 10 bits; however, whether it is the MSBs (most significant bits) or LSBs (least significant bits) or some of each that shall be discarded depends on the signal data spectrum, and so must be determined by simulation using realistic data. This makes verification of correct programming laborious.

Floating-point processors were introduced to circumvent the inconvenience of mentally keeping track of the point by automatically keeping track of the point with the aid of an "exponent" part associated with the "mantissa" part of each stored number. The IEEE standard floating-point format is:

SEEEEEEEE.MMMMMMMMMMMMMMMMMMMMMMM, where S is the sign of the value (0=+; 1=−), EEEEEEEE is the 8-bit exponent, and MMM . . . MM is the 23-bit mantissa. With the IEEE standard floating-point format, the 24th most significant bit of the mantissa is always 1 (except for true zero), and therefore omitted. In the IEEE format, the actual value of the mantissa is thus:

1.MMMMMMMMMMMMMMMMMMMMMMM.

For example, the base-2 logarithmic number $-1.40625 \times 10^{-2} = -1.8 \times 2^{-7}$ may be represented by the IEEE standard format as:

1 01111000.11001100110011001100110.

Further, the zero exponent is 01111111, and thus the number+ 1.0 may be written as:

0 01111111.00000000000000000000000.

Representing true zero would require a negatively infinite exponent, which is not practical, so an artificial zero is created by interpreting the all zeros bit pattern to be true zero instead of $2^{-127}$.

To multiply two floating-point numbers, the mantissas with their suppressed MSB 1's replaced, are multiplied using a fixed-point 24×24-bit multiplier, which is logic of moderately high complexity and delay, while the exponents are added and one of the offsets of 127 subtracted. The 48-bit result of multiplication must then be truncated to 24 bits and the most significant 1 deleted after left-justification. Multiplication is thus even more complicated for floating-point than for fixed-point numbers.

To add two floating-point numbers, their exponents must first be subtracted to see if their points are aligned. If the points are not aligned, the smaller number is selected to be right-shifted a number of binary places equal to the exponent difference to align the points before adding the mantissas, with their implied 1's replaced. To perform the shifting fast, a barrel shifter may be used, which is similar in structure and complexity to a fixed-point multiplier. After adding and more particularly subtracting, leading zeros must be left-shifted out of the mantissa while incrementing the exponent. Thus addition and subtraction are also complicated operations in floating-point arithmetic.

In purely linear format, additions and subtractions with fixed-point numbers are simple, while multiplications, divisions, squares, and square roots are more complicated. Multipliers are constructed as a sequence of "shift and conditionally add" circuits that have inherently a large number of logic delays. Fast processors may use pipelining to overcome this delay, but this typically complicates programming. It is therefore of interest to minimize the pipelining delay in a fast processor.

It should be noted that the floating-point number representation is a hybrid between logarithmic and linear representation. The exponent is the whole part of log to the base-2 of the number, while the mantissa is a linear fractional part. Because multiplication is complicated for linear representations and adds are complicated for logarithmic representations, this explains why both are complicated for the hybrid floating-point representations. To overcome this, some known systems, such as those cited above, have used a purely logarithmic representation. This solves the problem of keeping track of the point and simplifies multiplication, leaving only addition complicated. The logarithmic additions were performed in the prior art using look-up tables. However, limitations on the size of the tables restricted this solution to limited word length, for example to the 0-24 bit range. In the above reference to Coleman, 32-bit precision was achieved with reasonably sized look-up tables using an interpolation technique that requires a multiplier. As such, the Coleman process still includes the complexities associated with multiplication.

A different technique for extending precision while retaining reasonably sized look-up tables without requiring a multiplier was described for real arithmetic in U.S. Pat. No. 5,944,774 to current Applicant, which is hereby incorporated by reference herein. However, a method and apparatus for complex arithmetic, typically useful in radio signal processing, is required, as is a method with both real and complex processing capabilities, because both are usually required in common applications such as wireless communication devices. U.S. patent application Ser. No. 11/142,760 filed concurrently with this application addresses this problem, and is incorporated by reference herein in its entirety. Further, a method and apparatus that implements a multi-stage pipeline may be useful for increasing throughput speed while implementing complex and/or real arithmetic processes.

SUMMARY OF THE INVENTION

The present invention relates to an arithmetic logic unit to perform arithmetic computations with numbers represented in a logarithmic format. Using a logarithmic number representation simplifies multiplication and division operations, but makes subtraction and addition more difficult. However, the logarithm of the sum or difference of two numbers may be simplified using known algorithms, as discussed briefly below. In the following discussion, it is assumed that a>b and that c=a+b. It can be shown that:

$$C=\log_q(c)=\log_q(a+b)=A+\log_q(1+q^{-r}), \quad (1)$$

where q is the base of the logarithm, $r=A-B$, $A=\log_q(a)$, and $B=\log_q(b)$. The operation represented by Eq. (1), referred to herein as logadd, allows the log of the sum of a and b to be computed using only addition and subtraction operations, where the value of $\log_q(1+q^{-r})$ is determined using a look-up table. However, the processor needs sufficient memory to store the look-up table. For 32-bit high precision numbers, the look-up tables may be too large for practical use in many circuits, so a direct look-up method generally applies to only 16-bit numbers.

To reduce the size of the look-up tables, the function $\log_q(1+q^{-r})$ may be decomposed into two or more look-up functions by dividing the argument $r=A-B$ into a most significant portion ($r_M$) and a least significant portion ($r_L$). For the logadd operation, it can be shown that $C=A+\log_q(1+q^{-r})$, where $\log_q(1+q^{-r})$ may be expressed as three partial values:

$$\log_q(1+q^{-r_M^+})+\log_q(1+q^{-r'_{M+}})+\log_q(1+q^{-r''_{M}^+}) \quad (2)$$

and where $r_M^+$ represents an augmented version of $r_M$, and r may be represented by:

$$r''=r'+\log_q(1+q^{-r'_{M}^+})-\log_q(1-q^{-r'_{L}^-})$$
$$r'=r+\log_q(1+q^{-r_M^+})-\log_q(1q^{-r_L^+}) \quad (3)$$

As discussed further below, $$F(r_M)=\log_q(1+q^{-r_M^+})$$
$$G(r_L)=\log_q(1-q^{-r_L^-}) \quad (4)$$

where $r_L^-$ is equivalent to the amount by which $r_M$ was augmented to obtain $r_M^+$ less the original least significant part $r_L$. The desired value C may thus be computed as the sum of A and three partial values determined by a look-up function. As shown in Equation (2), the look-up function is the same for all three partial values; only the argument changes. The argument to the look-up function is based on $r=A-B$ and may be computed iteratively. The argument r for the first look-up function is A−B, which may be represented by $r_M$ and $r_L$. The argument $r'=\{r'_M; r'_L\}$ for the second look-up function is determined by $r+F(r_M)+G(r_L)$, and the argument $r''=\{r''_M; r''_L\}$ for the third look-up function is determined by $r'+F(r'_M)+G(r'_L)$.

Thus, C may be computed based on an iterative algorithm that uses two relatively small look-up tables as compared to the non-iterative approach. However, the multiple iterations required by the iterative approach requires more processing time, but perhaps no more than the multiplier used in the interpolation technique.

Pipelining is a technique for increasing throughput of a processor, and therefore, for reducing the computation time. The concept behind pipelining is to perform part of a computation in each one of a plurality of stages. As soon as one calculation progresses beyond the first stage, a new calculation may be started. If each stage takes one cycle, the entire calculation in a 3-stage pipeline will take three cycles. However, a calculation will be completed once every cycle because a new calculation can begin before the previous calculation is complete.

Pipelining may be used to perform logarithmic calculations as described above, with each pipeline stage performing one iteration in the look-up function calculation. However, each stage of the pipeline needs a look-up table so that in a 3-stage pipeline there will be three look-up tables. In the logadd function, the look-up function is the same in all three stages. The need to duplicate the entire look-up table in multiple stages of the pipeline to obtain higher throughput largely would mitigate the benefit of the iterative approach, which was to reduce the size of the look-up table.

However, it can be observed that the arguments {r, r′, r″ . . . } to the look-up function in successive iterations of the logadd operation increase monotonically. That is, the series {r, r′, r″ . . . } is an increasing series, and r′ is guaranteed to be greater than r by at least a certain amount. Consequently, the second and subsequent iterations of the logarithmic addition operation do not require the full look-up table. In the second iteration, values in the look-up table addressed by arguments less than the minimum value or r′ may be omitted. In the third stage, values in the look-up table addressed by arguments less than the minimum value of r″ may be omitted. In addition, in the first stage, values in the look-up table addressed by arguments greater than the minimum value of r′ may be omitted. As a result, using reduced size look-up tables in the first, second, and/or subsequent stages of the logadd enables a pipelined architecture to be used while still taking advantage of reduced look-up table sizes.

The present invention comprises a method and arithmetic logic unit (ALU) for implementing logarithmic arithmetic in a multi-stage pipeline. According to one embodiment of the present invention, two or more sub-functions are used by respective stages of the pipeline, where each sub-function is derived from a decomposed master function. Memory stores a sub-function look-up table for each sub-function. Therefore, each look-up table may represent some portion or all of a master function look-up table.

Respective stages of the pipeline execute respective sub-functions based on the stage input to obtain an output for each stage. An output combiner combines the stage outputs to generate the logarithm output. In one embodiment, the size of the sub-function look-up table for each stage is based on an expected range of values for the associated stage. Further, the size of the sub-function look-up tables may differ from stage to stage in either number of entries, word length, or both.

According to one embodiment of the present invention, a correction table computes a correction value for at least one stage based on the stage input. In this embodiment, the input for a subsequent stage is derived based on the correction value and the stage input and stage output generated by the preceding stage.

In addition, if an argument for a particular stage is not within the expected argument range for that stage, the pipeline of the present invention may skip one or more stages and apply the argument directly to the stage for which the argument is within that stage's argument range. For example, if the argument input into the first stage is greater than the minimum value of r′, the pipeline of the present invention may allow bypassing the first stage, and applying the argument directly to the second stage.

The present invention comprises a method and arithmetic logic unit (ALU) for implementing logarithmic in a multi-stage pipeline. According to one embodiment of the present invention, a master function is decomposed into two or more subsequent functions used by respective stages of the pipeline. Memory stores a sub-function look-up table for each sub-function. Therefore, each look-up table may represent some portion or all of a master function table.

Respective stages of the pipeline execute respective sub-functions based on the stage input to obtain a stage output for each stage. An output combiner combines the stage outputs to generate the final output. In one embodiment, the size of the sub-function look-up table for each stage is based on an expected range of values for the associated stage. Further, the size of the sub-function look-up tables may differ from stage to stage.

According to one embodiment of the present invention, a correction table G computes a correction value for at least one stage based on the stage input. In this embodiment, the input for a subsequent stage is derived based on the correction value and the stage input and stage output generated by the preceding stage.

BRIEF DESCRIPTION OF THE DRAWINGS

FIG. 2 illustrates a chart comparison between IEEE floating-point format and true logarithmic format for real numbers.

DETAILED DESCRIPTION OF THE INVENTION

Figure 1:
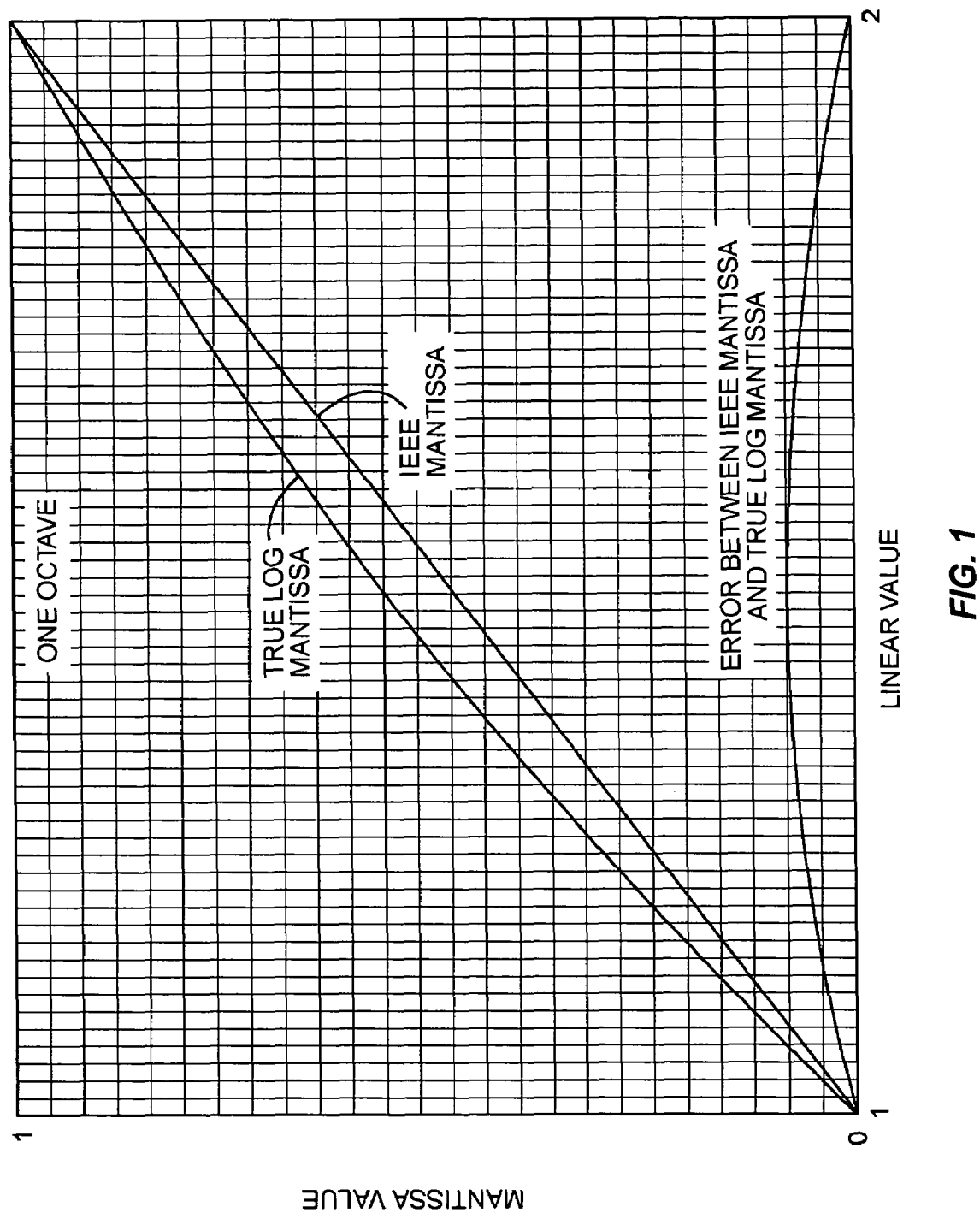
FIG. 1 illustrates a plot comparison between IEEE floating-point format and true logarithmic format for real numbers.

The present invention provides an ALU having a simplified multi-stage pipeline for implementing logarithmic computations. Broadly, each stage of the multi-stage pipeline produces a partial logarithmic output based on a function table F addressed by the stage input. To simplify the pipeline, the function table of at least one stage may be of different size, either in number of entries or word length, or both, than the function table of another stage. In a preferred embodiment, a master function look-up table may be decomposed into multiple sub-function look-up tables, where each sub-function look-up table is used in a corresponding stage of the pipeline. As used herein, a "master function look-up table" refers to a master look-up table associated with a master look-up function. In this embodiment, the combined size of all the sub-function look-up tables from all of the stages approximately equals the size of the master function look-up table. To better understand the details and benefits of the invention, the following provides details regarding number representation, conventional interpolation, iterative logarithmic operations, high precision iterative logarithmic addition, high precision iterative logarithmic subtraction, and exponential approximation.

Number Representation

Logarithmic operations implemented in an ALU generally require a specific number format. As discussed above, conventional processors may format real or complex numbers in a fixed-point binary format or a floating-point format. As discussed above, the fixed point format is a purely linear format. Therefore, additions and subtractions with fixed-point numbers are simple, while multiplications are more complicated. Floating-point numbers are a hybrid between logarithmic and linear representations. Therefore, addition, subtraction, multiplication, and division are all complicated in floating-point format. To overcome some of the difficulties associated with these formats, a purely logarithmic format may be used with an appropriate algorithm to solve the addition and subtraction problem associated with the logarithm format. The following provides additional details associated with the purely logarithmic format as it may apply to the present invention.

Real numbers in a purely logarithmic format may be abbreviated as (S 8.23) and represented as:

S xxxxxxxx.xxxxxxxxxxxxxxxxxxxxxxx.

Two such real numbers may be used as one way to represent complex numbers. However, as described in the related application Ser. No. 11/142,760, a logpolar format may be a more advantageous way to represent complex numbers.

The base used for the logarithms is open to choice. However, there are advantages with choosing one base over another. Choosing base-2, for example, has a number of advantages. First, as shown in Equation (5), a 32-bit pure logarithmic format then looks substantially identical to the (S8.23) IEEE floating-point representation.

Pure logarithmic: S xx . . . xx.xx . . . xx⇔$(-1)^S \times 2^{xx...xx.xx...xx}$ $$IEEE: S\ EE\ldots EE.MM\ldots MM \Leftrightarrow (-1)^S \times (1+0.MM\ldots .MM) \times 2^{-EE\ldots EE} \quad (5)$$

The whole part of log to the base-2 may be offset by 127 as in the IEEE format so that the number 1.0 is represented in either format by:

0 01111111.00000000000000000000000.

Alternatively, an offset of 128 could be used, in which case 1.0 is represented by:

0 10000000.00000000000000000000000.

Using 127 or 128 as the preferred offset is a matter of implementation.

The all zeros pattern may be defined as an artificial true zero, as in the IEEE floating-point format. In fact, if the same exponent offset (127) is used, such a pure logarithmic format coincides with the IEEE format for all numbers that are a power of two, e.g., 4, 2, 1, 0.5, etc., and the mantissa part of each differs only slightly in between powers of two, as shown in FIG. 1.

With the purely logarithmic format, the maximum representable value is:

0 11111111.11111111111111111111111, which for base-2 represents a logarithm of almost 256 minus the offset of 127, i.e., a number of almost $2^{129}$ or $6.81 \times 10^{38}$.

The smallest representable value is:

0 00000000.00000000000000000000000, which for base-2 represents a logarithm equal to −127, which is 5.88×10⁻³⁹. If desired, this all-zeros format may, as in the IEEE case, be reserved to represent an artificial true zero. In this scenario, the smallest representable number is:

0 00000000.00000000000000000000001, which is a base-2 logarithm equal to almost −127, which still corresponds to approximately 5.88×10⁻³⁹.

The quantization accuracy of the IEEE mantissa, which has a value between 1 and 2, is the LSB value of $2^{-23}$, an accuracy of between $2^{-23}$ and $2^{-24}$ (0.6 to 1.2×10⁻⁷). The accuracy of representing a number x in base-2 log format is a constant $2^{-23}$ in the logarithm, which gives $dx/x = \log_e(2) \times 2^{-23}$ or 0.83× 10⁻⁷, which is slightly better than the average of the IEEE quantization accuracy.

In another implementation, logarithms to other bases, such as base-e, may be used. For base-e, real numbers may then be stored in 32-bit sign plus logmagnitude format denoted by:

S xxxxxxx.xxxxxxxxxxxxxxxxxxxxxxxx, or (S7.24) for short. Due to the larger base (e=2.718), a smaller number of bits to the left of the point suffices to give an adequate dynamic range, while an extra bit to the right of the point is needed for equivalent or better precision, as discussed further below.

The logmagnitude part may be a signed, fixed-point quantity wherein the leftmost bit is the sign bit, not to be confused with the sign S of the represented number. Alternatively, the logmagnitude part may be offset by +64 (or +63) so that the bit pattern:

0 1000000.00000000000000000000000 represents a zero log (number=1.0). In the latter case, the largest representable number has the base-e log:

0 1111111.11111111111111111111111, which is almost 128, less the offset of 64, i.e., $e^{64}$ or 6.24× 10²⁷, while the reciprocal represents the smallest representable number. Equation (6) represents the quantization accuracy of the base-e log representation.

$$\frac{dx}{x} = 2^{-24} = 0.6 \times 10^{-7} \quad (6)$$

FIG. 2 compares the IEEE Floating-point Format (with +127 offset) with the base-e format (with +64 offset) and the base-2 format (with +127 offset).

Choosing the base is in fact equivalent to determining a trade-off between dynamic range and precision within the fixed word length, and is equivalent to moving the point in steps of less than one whole bit. Choosing bases of 2 or 4 or √2 (in general $2^{72^N}$, where N is a positive or negative integer) is equivalent to moving the point plus or minus N bit positions while giving the identical performance. Choosing a base of 8 however is not equivalent to moving the point a whole number of places, as it divides the log by 3. In other words, selecting the logarithm base is mathematically equivalent to changing the split of bits between the right and the left side of the binary point, which alters the compromise between accuracy and dynamic range. The point may, however, only be shifted in steps, while the base may be varied continuously. In the case of a signed logmagnitude, (as opposed to an unsigned, 127-offset logmagnitude) the sign bit is distinguished from the sign of the number (the S-bit) by referring to it as the sign of the logmagnitude. To clarify this further, consider that in base-10 logarithms, $\log_{10}(3)=0.4771$, while $\log_{10}(\frac{1}{3})=-0.4771$. Thus, to indicate a value of +3 in logarithmic, the sign of both the number and its log is +, which may be written ++0.4771. The following table illustrates this notation.

| Notation | Representation |
| --- | --- |
| ++0.4771 | +3 in base-10 logarithmic |
| +−0.4771 | +⅓ in base-10 logarithmic |
| −+0.4771 | −3 in base-10 logarithmic |
| −−0.4771 | −⅓ in base-10 logarithmic |

To ensure all logarithmic representations are positive, an offset representation may be used. For example, if quantities were instead represented by the logarithm of how many times larger they were than a selected number, e.g., 0.0001, the representation of 3 would be $\log_{10}(3/0.0001)=4.4771$ and the representation of ⅓ would be $\log_{10}(0.3333/0.0001)=3.5229$. Due to the offset, both are now positive. The representation of 0.0001 would be $\log(0.0001/0.0001)=0$. An all-zeros bit pattern then represents the smallest possible quantity of 0.0001.

Traditional log tables require storing 10,000 numbers for logs between 0.0000 and 0.9999 to look-up the antilogarithm, and a similar amount to obtain the logarithm to the same precision. Logarithmic identities may be used to reduce the size of look-up tables. For example, $\log_{10}(3)=0.4771$ and $\log_{10}(2)=0.3010$. From this it can be immediately deduced that:

$$\log_1(6) = \log_{10}(2\times3) = \log_{10}(3) + \log_{10}(2) = 0.4771 + 0.3010 = 0.7781.$$

It can also be immediately deduced that:

$$\log_{10}(1.5) = \log_{10}(3/2) = \log_{10}(3) - \log_{10}(2) = 0.4771 - 0.3010 = 0.1761.$$

It cannot, however, be immediately deduced that:

$$\log_{10}(5) = \log_{10}(2+3) = 0.6990$$

by any simple manipulation of the given numbers 0.4771 and 0.3010. Even less obvious is how $$\log_{10}(1) = \log_{10}(3-2) = 0$$

may be deduced from the logarithms of 3 and 2.

To address this problem, a look-up table based on a logadd function $F_a$ may be used. For example, the logarithm of (2+3) may be obtained by adding the larger of $\log_{10}(3)$ and $\log_{10}(2)$, that is 0.4771, to a function of their difference $F_a[\log_{10}(3) - \log_{10}(2)] = F_a(0.1761)$, where for base-10:

$$F_a(x) = \log_{10}(1+10^{-x}) \quad (7)$$

Similarly, the log of 3−2 may be obtained by subtracting a function $F_s(0.1761)$ from the larger of $\log_{10}(3)$ and $\log_{10}(2)$, where $F_s(x)$ for base-10 is:

$$F_s(x) = \log_{10}(1-10^{-x}) \quad (8)$$

However, a look-up table for $F_a(x)$ and $F_s(x)$ still requires storing at least 10,000 numbers for each function.

Interpolation Method

Interpolation may be used to reduce the number of values to be stored in the look-up table. To facilitate later discussions, the following examines interpolation in greater detail. Base-e is used for simplicity of illustration. However, it will be appreciated that other bases are equally applicable.

To compute the function $F_a(x) = \log_e(1+e^{-x})$ using a limited number of tabular values exemplified by $x_o$, a Taylor/Mc- Claurin expansion of the function F(x) about the tabular point $x_o$ gives:

$$F(x)=F(x_o)+(x-x_o)F'(x_o)+0.5(x-x_o)^2F''(x_o)\ldots, \quad (9)$$

where ' signifies the first derivative, " signifies the second derivative, etc. Based on this expansion, $\log_e(c)=\log_e(a+b)$ may be computed as $\log_e(a)+F_a(x)$ using the benefits of the Taylor McClaurin expansion, where $x=\log_e(a)-\log_e(b)$, and where values for $x_o$ are provided in a table.

To use simple linear interpolation for the 32-bit base-e case, the second order term involving the second derivative F''' must be negligible to the 24th binary place, e.g., less than $2^{-25}$. Differentiation of $F_a(x)=\log_e(1+e^{-x})$ yields:

$$F'_a(x) = \frac{-e^{-x}}{1+e^{-x}} \quad (10)$$

$$F''_a(x) = \frac{e^{-x}}{(1+e^{-x})^2}.$$

$F_a''(x)$ peaks at 0.25 when x=0. Thus, the second order term is less than $2^{-25}$ when $(x-x_o)<2^{-11}$. To meet this requirement, the most significant bits address the tabular points $x_o$ in the format (5.11), i.e., xxxxx.xxxxxxxxxxx, in order for the remainder $dx=x-x_o$ to be of the form:

0.00000000000xxxxxxxxxxxxx, and therefore less than $2^{-11}$. As such, dx is a 13-bit quantity and $x_o$ is a 16-bit quantity.

The accuracy of the linear interpolative term $F_a'(x_o)$ must also be of the order $2^{-25}$. Because $F_a'(x_o)$ is multiplied by dx, which is less than $2^{-11}$, the accuracy of $F_a'(x_o)$ must be $2^{-14}$. An extra couple of LSBs may be provided in the table for $F_a(x_o)$ to help reduce rounding errors, which suggests that a look-up table 5 bytes (40 bits) wide is required to store both F and F' for each $x_o$ value.

Therefore, the tabular values comprise $2^{16}=65,536$ values of 26-bit $F_a$ and the same number of corresponding 14-bit $F_a'$ values. In addition, a 14×13 bit multiplier is required to form dx·$F_a'$. Such a multiplier inherently performs 13 shift-and-add operations, and thus includes approximately 13 logic delays. The complexity and delay of a multiplier may be reduced somewhat by using Booth's algorithm, however the conventional multiplier may be used as a benchmark.

Figure 3:
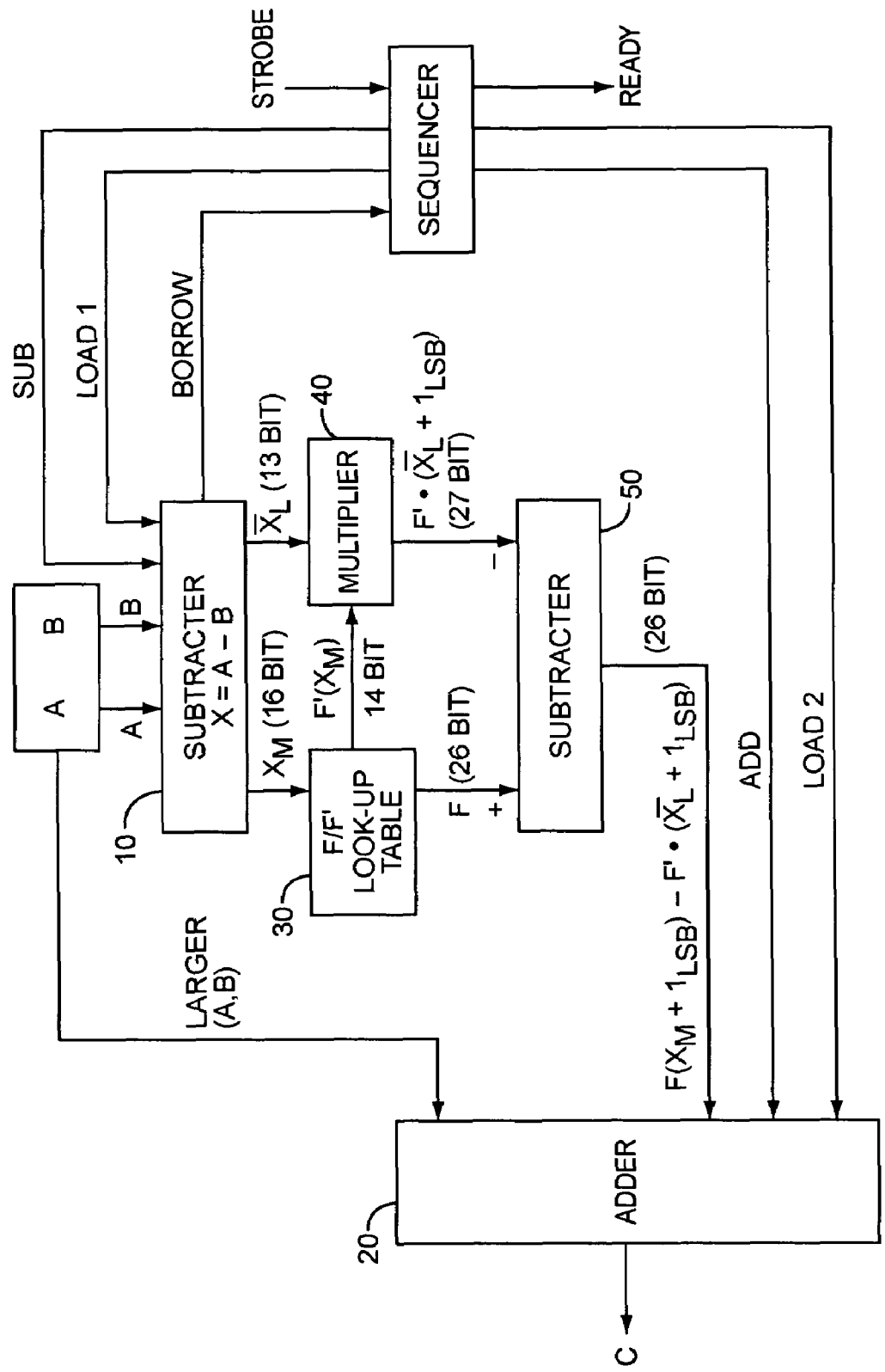
FIG. 3 illustrates a block diagram of a linear interpolator.

FIG. 3 illustrates an exemplary block diagram of a conventional ALU that implements the above-discussed linear interpolation. The ALU of FIG. 3 estimates the value $C=\log_e(A+B)$ using subtracter 10, adder 20, $F_a/F_a'$ look-up table 30, multiplier 40, and subtracter 50. As used in this example, $A=\log_e(a)$ and $B=\log_e(b)$. Because there may be a need to do backwards interpolation for subtraction to avoid singularity, as discussed below, FIG. 3 illustrates interpolation from $X_M$, a value of $x_o$ one more than the most significant 16 bit part of x. Look-up table 30 for $F_a$ contains the value of $F_a$ at $X_M+1$, therefore, and the value for $F_a'$ contained may be the value at the median of the interval, namely the value of $F_a'$ computed at $X_M+0.5$. Multiplier 40 multiplies the 14-bit $F_a'(X_M)$ value by the 13 bit two's complement of the least significant 13 bits of x, $\overline{X}_L$. Further, multiplier 40 is configured so that the result is the 27-bit product of $F_a'(X_M)$ and $(\overline{X}_L+1_{LSB})$.

The LSB of the 27-bit product may be input as the borrow to subtracter 50, and the remaining 26 bits subtracted from the 26-bit $F_a'(X_M)$ value to yield the interpolated value to 26 bits, which is then added to the larger of A and B in output adder 20, rounding up the result C to 31 bits of logmagnitude by means of a carry-in bit of '1'.

A practical 31-bit logadder based on linear interpolation therefore comprises approximately 65,536×40=2.62 Mbits of look-up table 30 and a 13×14 bit multiplier 40. These components consume significant silicon area and have no speed advantage in terms of logic delays. However, in order to address subtraction or complex arithmetic operations using the interpolation method, substantial adjustment to word lengths and multiplier configuration are necessary.

For example, to implement subtraction using interpolation, function values are determined according to a subtraction function equation, given by:

$$F_s(x)=\log_e(1-e^{-x}). \quad (11)$$

The Taylor/McClaurin expansion of $F_s(x)$ involves the first order derivative:

$$F_s'(x) = \frac{e^{-x}}{1-e^{-x}}, \quad (12)$$

which tends to infinity as x tends to 0. To distance operations from this singularity, the function may be interpolated backwards from a tabular value one LSB greater than the actual value of $x=\log_e(A)-\log_e(B)$ (when A>B), by means of:

$$F_s(x)=F_s(x_o)-(x_o-x)F_s'(x_o), \quad (13)$$

which is the implementation illustrated for logadd in FIG. 3. Then, when at least the most significant bits of x are zero, $x_o$ is one LSB greater in value, just avoiding the singularity.

With the same 16/13-bit split as for addition, the minimum value of $x_o$ is $2^{-11}$ and the size of $F_s'$ is then approximately 2,048 values. However, the value of $F_s'$ is 12 bits longer than its logadd counterparts, which therefore, increases the size of the multiplier for forming dx·$F_s'$ to a 13×26-bit device. In light of the above, the synergy between real addition and real subtraction as well as for complex operations is thus limited in ALUs implementing interpolation. One solution to the latter problem proposed in the co-pending application (4015-5281) is based on the realization that, because the look-up tables dominate the chip area, it costs little to build separate circuits for add and subtract, thus permitting Butterflies (simultaneous adds and subtracts, useful in FFTs) to be performed. A similar argument suggests building separate circuits for real and complex operations to allow parallel processing. In any event, the need for both look-up tables and multiplications to perform interpolation makes the traditional interpolation method more complicated to implement in hardware logic.

Iterative Logarithmic Operations

As an alternative to the above-described interpolation process and to reduce the storage requirements, an iterative solution may be used. The iterative solution uses two relatively smaller look-up tables to compute a logarithm output using an iterative process based on tabulated functions. To illustrate the iterative solution, a decimal example is provided to illustrate how $\log_{10}(5)=\log_{10}(3+2)$ and how $\log_{10}(1)=\log_{10}(3-2)$ may be deduced from $\log_{10}(3)=0.4771$ and $\log_{10}(2)=0.3010$.

The logadd function table, also referred to herein as the $F_a$-table, stores 50 values based on Equation (7) for base-10 and for values of x between 0.0 and 4.9 in steps of 0.1. Another table, referred to herein as the correction table or the G-table, stores 99 values for values of y between 0.001 and 0.099 in steps of 0.001 based on:

$$G(y) = -\log_{10}(1 - 10^{-y}). \tag{14}$$

The following illustrates the two-table iterative process for the above log(5)=log(3+2) example using these two look-up tables. While the following is described in terms of base-10, those skilled in the art will appreciate that any base may be used. For embodiments using a base differing from base-10, it will be appreciated that while Equations (7) and (14) define the function and correction tables, respectively, for base-10 calculations, Equation (15) generically defines the function and correction tables for any base q.

$$F_a(x) = \log_q(1 + q^{-x})$$

$$G(y) = -\log_q(1 - q^{-y}) \tag{15}$$

For the logadd process, the argument $x = A - B = \log_{10}(3) - \log_{10}(2) = 0.1761$ is first rounded up to the nearest tenth, 0.2. From the $F_a$-table of 50 values we find $F_a(0.2) = 0.2124$. Adding 0.2124 to 0.4771 results in a first approximation for $\log_{10}(2+3)$ of 0.6895. The error value resulting from rounding x from 0.1761 to 0.2 is 0.0239. This error will never be more than 0.099, so the 99 value correction look-up table G(y) is used. For the correction value y=0.0239, rounded up to 0.024, the G-table provides a correction value of 1.2695. Combining G(y)=1.2695 with the value from the first look-up table $F_a(0.2)=(0.2124)$ and the original value of x (0.1761) generates a new argument for $F_a$, x'=1.658. Those skilled in the art will appreciate that the prime qualifying the x in this case does not represent differentiation.

When rounded up to the nearest tenth, x'=1.7. $F_a(1.7) = 0.0086$, which when added to the first approximation for $\log_{10}(2+3)$ of 0.6895 gives the second approximation of 0.6981. The error in rounding up 1.658 to 1.7 is 0.042. Looking y=0.042 up in the G-table gives the value 1.035, which when added with the previous $F_a$ value of 0.0086 and with x'=1.658 results in a new x-value, x"=2.7016. After rounding x" up to 2.8, using the $F_a$-table produces $F_a(2.8)=0.0007$. Adding 0.0007 to the second approximation (0.6981) gives a third and final approximation of 0.6988, which is considered close enough to the actual value of 0.6990 for the precision expected when using an $F_a$ look-up table of only 50 values and a G look-up table of only 100 values. If desired, a further iteration may be done for a slight increase in precision. However, more than three iterations are generally not necessary for addition. Alternatively, if the maximum number of iterations is preset to three, the argument of $F_a$ for the last iteration may be rounded down to the nearest tenth of 2.7, instead of always up. $F_a(2.7)=0.0009$, which when added to the second approximation for $\log_{10}(3+2)$ of 0.6981 gives the expected result $\log_{10}(5) = \log_{10}(3+2) = 0.6990$.

The two-table iterative process comprises accepting a 3-step process in return for avoidance of multiplications and a 100-fold reduction in the look-up table sizes. In a hardware implementation, the total number of logic delays required for three iterations may in fact be less than the number of logic delays through the repetitive add/shift structure of a multiplier. In any event, the above-discussed reduction of look-up table size is useful when silicon area and/or precision are of primary importance.

The value for $\log_{10}(3-2)$ may be computed similarly. The starting approximation is the log of the larger number i.e. 0.4771. The $F_s$-table for subtraction stores the values:

$$F_s(x) = \log_{10}(1 - 10^{-x}) \text{ (for base-10)}$$

$$F_s(x) = \log_q(1 - q^{-x}) \text{ (for generic base-q)} \tag{16}$$

in steps of 0.1; the G-table remains the same. The difference between $\log_{10}(3)$ and $\log_{10}(2)$ of 0.1761 is rounded up to the nearest tenth of 0.2. Looking up 0.2 in the subtraction function table produces $F_s(0.2) = -0.4329$. Adding $-0.4329$ to the starting approximation of 0.4771 generates the first approximation for $\log_{10}(1)$ of 0.0442.

The error in rounding 0.1761 up to 0.2 is 0.0239, as for addition. Addressing the G-table as previously defined with 0.024 returns the value 1.2695. Adding 1.2695 to the previous $F_s$ argument of x=0.1761 and the previous $F_s$-table look-up value of $-0.4329$ produces a new $F_s$-table argument of x'=1.0127. Rounding x' up to the nearest tenth of 1.1 and using the $F_s$-table again yields $F_s(1.1) = -0.0359$. Adding $-0.0359$ to the first approximation (0.0442) gives the second approximation for $\log_{10}(1)$ of 0.0083. The error in rounding up 1.0127 to 1.1 was 0.0873. Using the value 0.087 to address the G-table gives G(0.087)=0.7410. When added to the previous unrounded $F_s$-table argument of 1.0127 and the $F_s$-table look-up value of $-0.0359$ a new $F_s$-table argument of x"=1.7178 is generated. Rounding x" up to 1.8 results in $F_s(1.8) = -0.0069$ which is added to the second approximation of 0.0083 to obtain a third approximation for $\log_{10}(1)$ of 0.0014. The error on rounding up 1.7178 to 1.8 was 0.0822. Addressing the G-table with 0.082 returns the value 0.7643. Adding this to the previous $F_s$-table argument of 1.7178 and the previous $F_s$-table look-up value of $-0.0069$ produces a new $F_s$-table argument of x'''=2.4752. Rounding 2.4752 up to 2.5 produces a function value of $F_s(2.5)=$"$-0.0014$. Adding $-0.0014$ to the third approximation (0.0014) gives $\log_{10}(1) = \log_{10}(3-2) = 0$, as expected. The algorithm converges because the argument of $F_s$ increases for each iteration, resulting in smaller and smaller corrections.

The above process for subtraction was the same as for addition apart from the use of the subtraction-version of the F-table. However, both addition and subtraction use the same G-table. Further, subtraction required one more iteration than addition to provide good accuracy; this is because the argument of $F_s$ rises slightly less rapidly with each iteration, especially with the first iteration, because the increment upon adding the $F_s$-value is negative in the case of subtraction.

High Precision Logadd

In general, the logadd problem to be solved for more general base-q logarithms may be given by the following steps:

Suppose $A = \log_q(a)$ and $B = \log_q(b)$, where a and b are positive numbers and q is the base.

Goal: find $C = \log_q(c)$ where $c = a + b$.

Thus, $C = \log_q(a+b) = \log_q(q^A + q^B)$,

Let A be the larger of A and B.

Then $C = \log_q(q^A(1 + q^{-(A-B)}))$ $= A + \log_q(1 + q^{-(A-B)})$ $= A + \log_q(1 + q^{-r})$, where $r = A - B$ and is positive.

Thus, the problem has been reduced to computing the function $\log_q(1 + q^{-r})$ of the single variable r.

If r has a limited word length, the function value may be obtained by a function look-up table. For example, for a 16-bit r-value, a function look-up table must store 65,536 words. Moreover, if r>9 in the case of base q=e=2.718, the value of the function will differ from zero by less than $2^{-13}$, which suggests that only a 4-bit whole part of r ranging up to 15 need be considered, together with a 12-bit fractional part. Then for r>9, the function value is zero to 12 binary places after the point, so the look-up table is only required for values of r up to 9, giving 9×4,096=36,864 words of memory.

Because the maximum value of the function is $\log_e(2)=0.69$ when r=0, only the 12-bit fractional part need be stored, so the memory requirements are only 36,864 12-bit words rather than 65,536, 16-bit words. In the case of base-2, the function is zero to 12 binary places for r>13, so again a 4-bit whole part of r only need be considered. If one bit is used for a sign, then the logmagnitude part is only 15 bits long, for example 4.11 format or 5.10 format, and the above figures may be adjusted accordingly.

To obtain much higher accuracies than 16 bits however, using for example word lengths of 32 bits, a direct look-up table for the function is excessively large. For example, to give accuracy and dynamic range comparable to the IEEE 32-bit floating-point standard, A and B should have 7-bit whole parts, 24-bit fractional parts and a sign bit each in the base-e case. The value of r must now be greater than 25 $\log_e(2)=17.32$ before the function is zero to 24-bit accuracy, which is representable by a 5-bit positive whole part of r. Thus, a potential 29-bit r-value of format 5.24 must be considered as the argument of the function $F_a$. A look-up table size of $18 \times 2^{24}$ or 302 million 24-bit words is required for a direct look-up of r for values between 0 and 18. Substantially all research into logarithmetic operations concerns reducing these table sizes, with the ultimate aim of making 64-bit word lengths practical. Several techniques described herein advance the art towards this goal.

To reduce the size of the look-up table from a single large table, as required for a direct look-up of the logadd function $F_a$ that uses all the bits of r as the address, one implementation of the invention comprises splitting r into most significant (MS) and least significant (LS) parts, $r_M$ and $r_L$, respectively. These MS and LS parts address two much smaller tables, F and G, respectively, as will be described below. The MS portion represents a "rounded-up" version of the input value, while the LS portion represents the difference between the rounded-up version and the original full argument value.

Let $r_M$ be the most significant 14 bits of r<32 and $r_L$ be the least significant 15 bits of r, as shown in Equation (17).

$$r_M = xxxxx.xxxxxxxxx$$

$$r_L = 00000.000000000xxxxxxxxxxxxxxx \quad (17)$$

For simplicity, the length of $r_M$ and $r_L$ may be denoted as (5.9) and (15) for short. Other splits of r into most and least significant bit parts are equally useable by obvious modifications to the method, and some considerations for preferring a particular split, discussed further below, concern the ability to re-use the same F and G tables for other wordlengths (e.g., 16 bits) or for complex operations.

Let $r_M^+$ be the value of $r_M$ augmented by the greatest possible value of $r_L$, i.e., 00000.000000000111111111111111. It will be realized that this is just the original r-value with its least significant 15 bits set to 1's. In some implementations, $r_M$ may alternatively be augmented by 0.000000001, i.e., $$r_M^+ = xxxxx.xxxxxxxxx+00000.000000001. \quad (18)$$

Let a complementary value of $r_L$ be represented by:

$$r_L^- = r_M^+ - r, \quad (19)$$

which is then either the complement or the two's-complement of $r_L$ depending on which of the above two alternative augmentations for $r_M$ is used, i.e., $r_L^- = 00000.000000000111111111111111 - 00000.000000000xxxxxxxxxxxxxxx$ (the complement of $r_L$) or $r = 00000.000000001000000000000000 - 00000.000000000xxxxxxxxxxxxxxx$ (the twos-complement of $r_L$). Then the following for base-e results:

$$\log_e(1+e^{-r}) = \log_e(1+e^{-r_M^+} - e^{-r_M^+} + e^{-r}) \quad (20)$$

$$= \log_e\left((1+e^{-r_M^+})\left(1 + \frac{(e^{-r} - e^{-r_M^+})}{(1+e^{-r_M^+})}\right)\right)$$

$$= \log_e(1+e^{-r_M^+}) + \log_e(1+e^{-r'}),$$

where $r'=r+\log_e(1+e^{-r_M^+})-\log_e(1-e^{-r_L^-})$. Expanding $\log(1+e^{-r'})$ likewise results in:

$$\log_e(1+e^{-r'})=\log_e(1+e^{-r'_M{}^+})+\log_e(1+e^{-r''}), \quad (21)$$

where $r''=r'+\log_3(1+e^{-r'_M{}^+})-\log_e(1-e^{-r'_L{}^+})$. Iterating to a conclusion shows that the desired answer comprises the sum of functions:

$$\log_e(1+e^{-r_M^+}),$$

$$\log_e(1+e^{-r'_M{}^+}),$$

$$\log_e(1+e^{-r''_M{}^+}), \quad (22)$$

etc., that depend only on the most significant 14 bits of their respective r-arguments, which may then be obtained from a look-up table of only 16,384 words.

In the context of Equations (20)-(22), the prime(s) used to qualify the denoted r-values do not represent a derivative. Instead, the succession of r-values r, r', r", etc., is derived by accumulating to the preceding value the value just obtained from the logadd function look-up table ($F_a$) and adding a value depending on the least significant 15-bits of r, namely the value $-\log_e(1-e^{-r'_L{}^+})$, which is given by a correction look-up table, i.e., the G-table, which has 32,768 words because $r_L^-$ is a 15-bit value.

Although the stored values are computed from $r_M^+$ and $r_L^-$, the function and correction look-up tables may be directly addressed by $r_M$ and $r_L$, respectively. Calling these look-up table functions $F_a$ and G respectively, and noting that correction values are always highly negative, a positive correction value may be stored in the G-table. This positive correction value is added to the previous r-argument, instead of storing a negative value and subtracting it. Further, the minimum correction value of the G-table, or the whole part of it at least, may be subtracted from the stored values to reduce the number of bits stored, and added back whenever a value is pulled from the table. For base-2, a value of 8 is appropriate for the minimum correction value and does not even need to be added back to the pipeline implementation to be described. The iteration is then:

1. Initialize the output accumulator value C to the larger of A and B.
2. Initialize r to A−B if A is larger, or B−A if B is larger.
3. Split r into $r_M$ and $r_L$.
4. Look-up $F_a(r_M^+)$ and $G(r_L^-)$ as addressed by $r_M$ and $r_L$, respectively.
5. Accumulate $F_a$ with C and $F_a$+G with r.
6. Repeat from step 3 if r<STOP_THRESHOLD (discussed further below).

Those skilled in the art will appreciate that a few logic gates may be used to detect an r-value greater than 18 using the logic b6.OR.(b5.AND.(b4.OR.b3.OR.b2)) (the 32 bit set, or the 16 bit set with one of the 8, 4 or 2 bits set), where the bit index indicates the bit position to the left of the point. The value of the function $G(r_L^-) = \log_e(1-e^{-r_L^-})$ is always greater than 6.24 approximately, therefore the iteration always terminates in 3 cycles or less. Correction values are proportionally larger for base-2, so that r always exceeds 25 in at most 3 cycles for base-2 also. In general, 3 cycles typically suffice for any base.

High Precision Two-Table Logsub

If the signs S associated to A and B indicate a and b have the same sign, then the foregoing logarithmic addition algorithm, hereby dubbed "logadd," may be used. Otherwise a logarithmic subtraction algorithm, hereby dubbed "logsub," is required. The following table indicates when the respective algorithms are used:

| sign(a): | sign(b): | To add: | To subtract b from a: |
|---|---|---|---|
| + | + | Use logadd(A, B) | Use logsub(A, B) |
| + | − | Use logsub(A, B) | Use logadd(A, B) |
| − | + | Use logsub(B, A) | Use logadd(A, B) |
| − | − | Use logadd(A, B) | Use logsub(A, B) |

The sign of the result will always be the sign associated with the greater logmagnitude when the logadd algorithm is used.

The same holds true for the logsub algorithm if the sign associated with the second argument is first inverted. Inversion of the sign of the second argument may be done upon application of the second argument to the input of the logarithmic unit, when subtraction is desired. The "logsub" algorithm is derived as follows: Suppose $A=\log(|a|)$ and $B=\log(|b|)$ are given. It is desired to find $C=\log(c)$ where $c=|a|-|b|$. Let A be the larger of A and B. Dropping the absolute value characters (||) for clarity, and with a and b both now assumed positive, we have:

$$C = \log_e(a-b) = \log_e(e^A - e^B). \tag{23}$$

As with logadd, base-e is used in this example for illustration purposes only, and therefore, is not limiting.

Because A is assumed to be larger than B:

$$\begin{aligned} C &= \log_e(e^A(1-e^{-(A-B)})) \\ &= A + \log_e(1-e^{-(A-B)}) \\ &= A + \log_e(1-e^{-r}), \end{aligned} \tag{24}$$

where $r=A-B$ and is positive. Thus, the problem reduces to computing the function $\log(1-e^{-r})$ of the single variable r. Let $r_M, r_L, r_M^+$ and $r_L^-$ be as previously defined. Then, for base-e:

$$\begin{aligned} \log_e(1-e^{-r}) &= \log_e(1-e^{-r_M^+} + e^{-r_M^+} - e^{-r}) \\ &= \log_e\left((1-e^{-r_M^+})\left(1 - \frac{(e^{-r} - e^{-r_M^+})}{(1-e^{-r_M^+})}\right)\right) \\ &= \log_e(1-e^{-r_M^+}) + \log_e(1-e^{-r'}), \end{aligned} \tag{25}$$

where $r' = r + \log_e(1-e^{-r_M^+}) - \log_3(1-e^{-r_L^-})$. Expanding $\log_e(1-e^{-r'})$ likewise results in:

$$\log_e(1-e^{-r'}) = \log_e(1-e^{-r'_M^+}) + \log_e(1-e^{-r''}), \tag{26}$$

where $r'' = r' + \log_e(1-e^{-r'_M^+}) - \log_e(1-e^{-r'_L^-})$, and so forth. Iterating to a conclusion shows that the desired answer comprises the sum of functions:

$$\begin{aligned} &\log_e(1-e^{-r_M^+}), \\ &\log_e(1-e^{-r'_M^+}), \\ &\log_e(1-e^{-r''_M^+}), \end{aligned} \tag{27}$$

etc., that depend only on the most significant 14 bits of the respective full wordlength r-values, which may be given by a look-up table of only 16,384 words.

As with logadd, the look-up tables for logsub may be constructed to be directly addressed by $r_M$ and $r_L$ although the stored values are computed from $r_M^+$ and $r_L^-$. Further, as with logadd, the prime(s) used to modify the denoted r-values do not represent a derivative.

Calling these look-up tables $F_s$ and G (G is the same look-up as for the logadd algorithm) respectively, and storing the positive value of G as before produces the required $F_s$ and G tables for logsub operations. Because $1-e^{-r}$ is always less than 1, $F_s$ will always be negative, so a positive magnitude may be stored and subtracted rather than added. Another method stores the negative value stripped of its negative sign bit, the negative sign bit being replaced outside the look-up table by appending a most significant '1' when subtraction is underway. The preferred choice is that which leads to simplicity of logic and maximum synergy of look-up table values between addition and subtraction, as discussed further below. In any event, the following steps outline the "logsub" process:

1. Initialize the output accumulator value C=larger of A and B.
2. Initialize r to A−B if A is larger, or B−A if B is larger.
3. Split r into $r_M$ and $r_L$.
4. Look-up $F_s(r_M^+)$ and $G(r_L^-)$, addressed by $r_M$ and $r_L$, respectively.
5. Accumulate $F_s$ with C and $F_s+G$ with r.
6. Repeat from step 3 if r<STOP_THRESHOLD (discussed below).

For both the LOGADD and the LOGSUB algorithms, STOP_THRESHOLD is chosen so that any contribution from a further iteration will be less than half an LSB. This occurs at 17.32 for base-e (can use 18) with 24 binary places after the point, or at 24 for base-2 with 23 binary places after the point. In principle, a base less than base-2 may be found that gives a STOP_THRESHOLD of 31, which would then use an F-function defined over the whole address space addressable by the selected MSBs of r. Alternatively, a base greater than base-e, may be found that gave a STOP_THRESHOLD of 15, with the same property. However, the practical advantages of base-2 seem greater than any advantage of using a full address space for the F-tables. In general, for base-2, STOP_THRESHOLD is simply 1 or 2 greater than the number of binary places of the log-representation after the point.

As suggested by the decimal examples given above, the accuracy after a finite number of iterations is improved if the final argument used to address the F-table, e.g., $r'''_M^+$, is rounded down rather than up from $r_M'''$. If the two-table iterative process always performs a fixed number of iterations, or if the process otherwise identifies the final iteration, the argument of F may be rounded down on the final iteration. The final iteration may be identified, for example, by r being within a certain range (~6 for base-e, or ~8 for base-2) of STOP_THRESHOLD, indicating that the next iteration is bound to exceed STOP_THRESHOLD. When this method is used, the address to the F-table may be reduced by 1 if the leftmost bit of $r_L$ is zero on the final iteration. In the pipelined implementation to be described, the final F-table contents are simply computed for a rounded-down argument.

The only difference between the LOGSUB and LOGADD algorithms is the use of the look-up table $F_s$ rather than $F_a$. Because both are of size 16,384 words, they may be combined into a single function F-table with an extra address bit to select the + or − version, denoted by $F(r_M,\text{opcode})$, where the extra argument "opcode" is the extra address bit having the value 0 or 1 to indicate whether to apply the LOGADD or LOGSUB algorithm. Alternatively, because the peripheral logic (i.e. input and output accumulators and adders/subtracters) is small compared to the respective look-up tables, it costs little to duplicate the peripheral logic to form an independent adder and subtracter. Yet another possibility considered below is to exploit the similarity between the functions $F_a$ and $-F_s$.

Exponential Approximation

As discussed above, $r_M^+$ may comprise either $r_M$ augmented by the largest possible value of $r_L$ (0.0000000001111111111111) or may comprise $r_M$ augmented by 0.000000001. An advantage in choosing the augmentation of $r_M$ to be 0.0000000001111111 . . . 1 instead of 0.000000001 is that the G table may be addressed by either the complement of $r_L$ during the iterative algorithm, or may be addressed by $r_L$ (not complemented) to get the value of F directly in the case $r_M=0$, thus allowing a single iteration to suffice for the otherwise difficult case of subtracting two nearly equal values. Making both the complemented and non-complemented values available is simpler and faster than forming the twos-complement, as no carries need to be propagated.

For logadd, the values of the $F_a$-table may be defined by:

$$F_a(X_M)=\log_2(1+2^{-(X_M+d)}), \quad (28)$$

where d represents an increment that is preferably the largest possible value of $X_L$, i.e., all 1's. The function can be constructed as a look-up table addressed by $X_M$. For subtraction, the values of the $F_s$-table may be defined by:

$$F_s(X_M)=-\log_2(1-2^{-(X_M+d)}) \quad (29)$$

$F_a(X_M)=F_s(X_M)$ for large values of $X_M$ and, for 32-bit arithmetic and an argument range between 16 and 24, may both be approximated adequately by:

$$E = 2^{-X_{M1}} \cdot \left(\frac{2^{-0 \cdot X_{M2}}}{\log_e(2)}\right), \quad (30)$$

where $X_{M1}$ is the whole part (bits to the left of the point) of $X_M$ and $X_{M2}$ is the fractional part, i.e. bits to the right of the point. The function in brackets may be stored in a small exponential look-up table. A right shifter may implement the whole part so that only the fractional bits need address the exponential function, reducing the table size.

Figure 4:
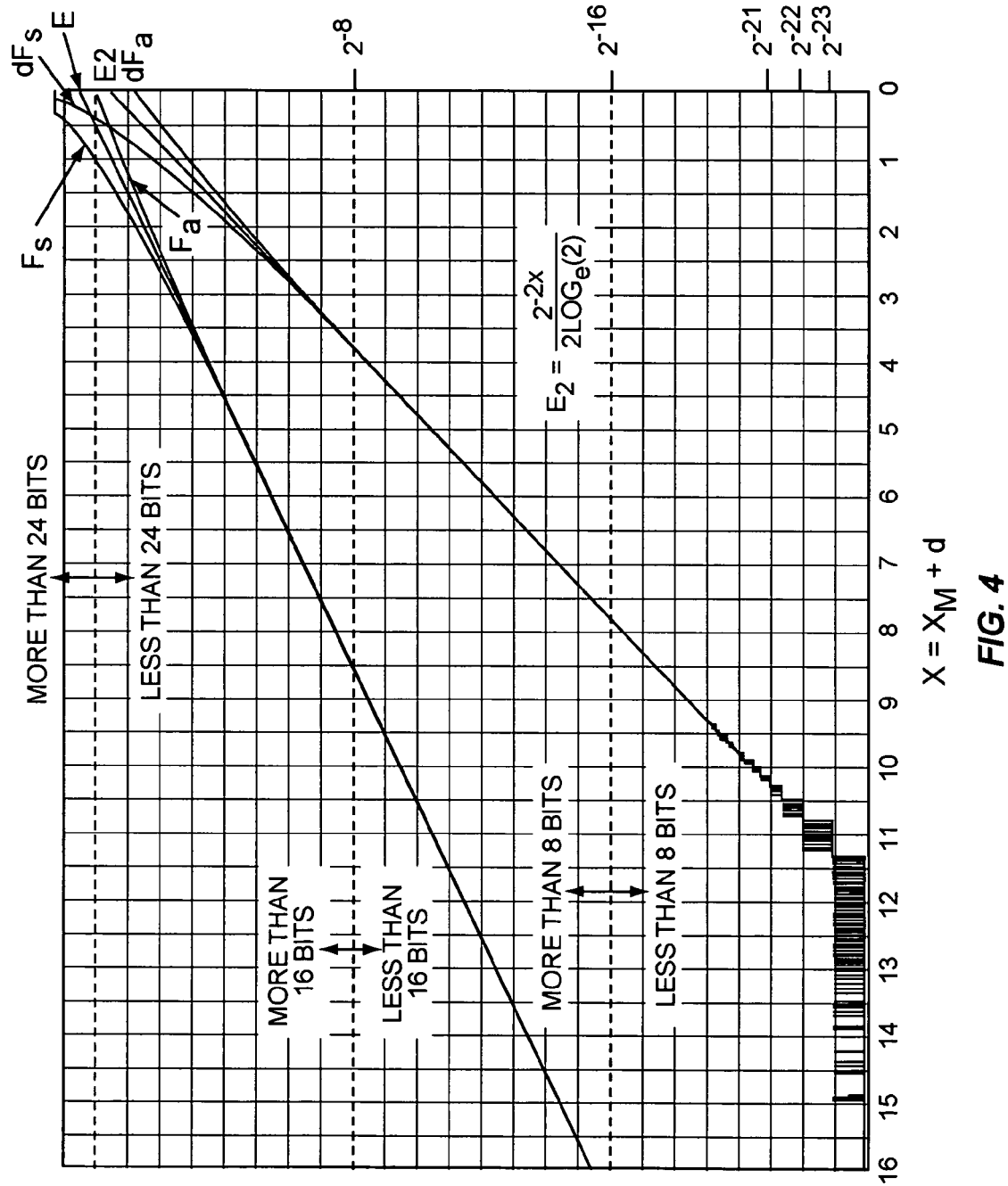
FIG. 4 illustrates a plot comparison between the true F-functions and an exponential approximation.

FIG. 4 illustrates the similarities between the exponential approximation (E) and the true function values ($F_a$, $F_s$). When the argument ranges between 16 and 24, E is substantially equivalent to both $F_a$ and $F_s$. Further, FIG. 4 also illustrates how a further approximation:

$$E_2 = \frac{2^{-2(X_M+d)}}{2 \log_e(2)} \quad (31)$$

also adequately approximates the difference between the exponential function and the true function values, $dF_a=E-F_a$ and $dF_a=F_s-E$. Therefore, for $X_M$ in the range 8 to 16, the exponential approximation E may be used when it is corrected by the small correction value $E_2$ less or equal to 8-bits in length, as may be seen from FIG. 4. The result is 17 bits in length when 24 places after the binary point are required.

Because the area under the E curve roughly approximates the silicon area required to implement the exponential approximation, FIG. 4 also illustrates the approximate silicon area required to implement the function tables for logadd and logsub operations. Using a base-2 logarithmic scale as the vertical scale means the height represents the wordlength of a binary value. The horizontal scale represents the number of such values. Therefore, the area below the curve represents the number of bits of ROM required to store the curve values. The exponential function E is cyclic however, its values repeating except for a right shift for every increment of 1. Thus, only one cycle addressed by the fractional part $X_{M2}$ need be stored and the result shifted a number of places given by $X_{M1}$. The exponential function E, therefore, requires very small tables. Further, because the correction values dF or $E_2$ clearly have a smaller area under their curves than the original $F_a$ and $F_s$ functions, using the exponential approximation E and storing corrections dF and $E_2$ requires smaller table sizes, and therefore less silicon area, than storing $F_a$ and $F_s$.

Equation (32) gives the G-function for the least significant bits as:

$$G(X_L)=-\log_2(1-2^{-(d-X_L)}), \quad (32)$$

where $(d-X_L)$ is equal to the complement of $X_L$ when d is all 1's. The minimum value of $G(X_L)$ depends on the split of the 31-bit logmagnitude between $X_M$ and $X_L$. If $X_M$ is of the form 5.8 then $X_L$ is of the form 0.00000000xxxxxxxxxxxxxxxx and less than $2^{-8}$. The minimum value of G is then 8.5 when $X_L=0$. For $X_M$ of the form (5.7), the minimum value of G=7.5, and for $X_M$ of format (5.9), the minimum value of G=9.5. Because the value of X increases by at least the value of G at each cycle, X will exceed 24 within 3 cycles as long as the three G values are on average greater than 8. In the following, the assumption of 32-bit arithmetic is maintained for the purposes of illustration. When the minimum value of G is 8.5, a base value of 8 may be subtracted from the stored values.

Figure 5:
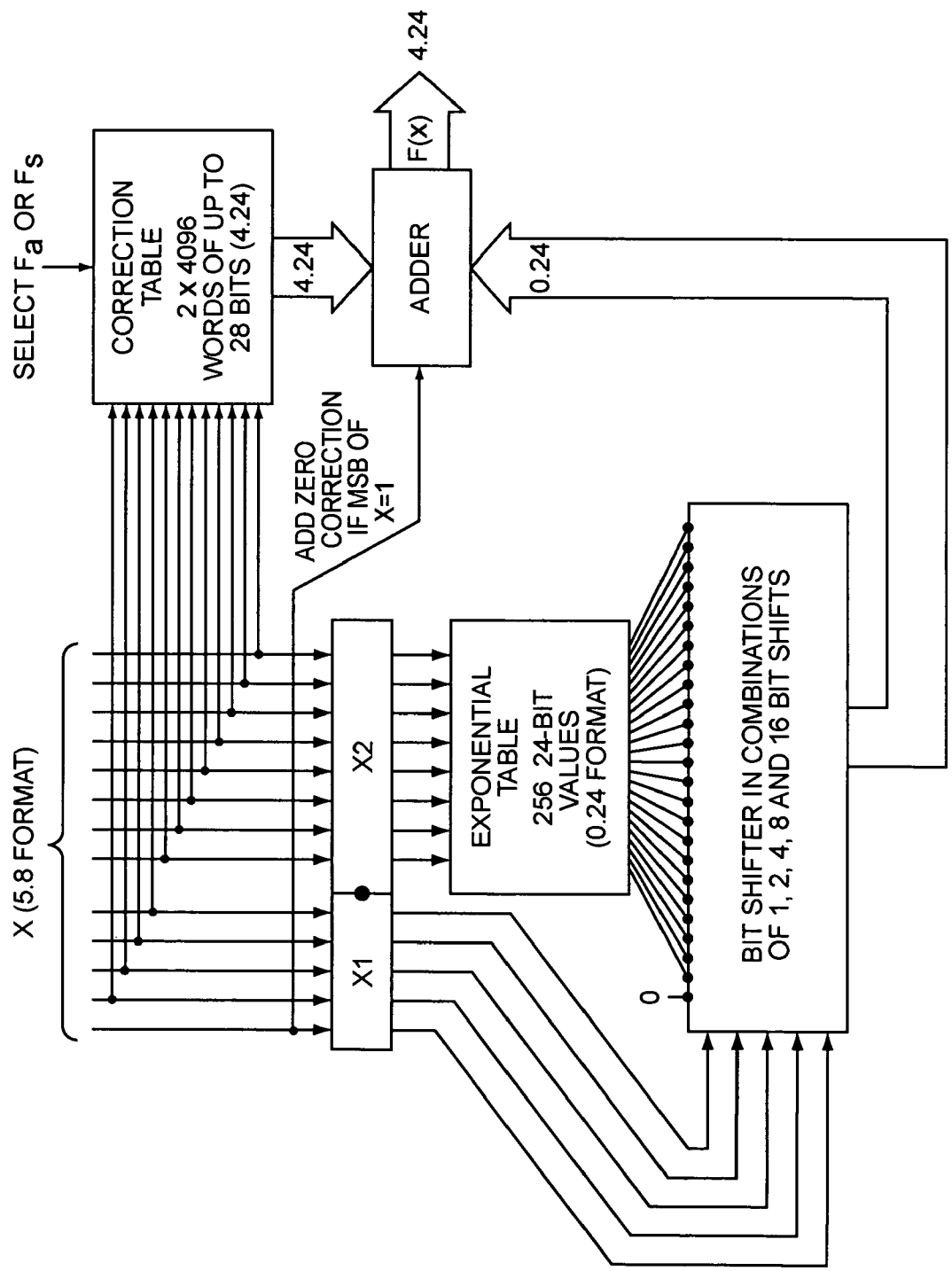
FIG. 5 illustrates a block diagram of an F-table construction system.
Figure 6:
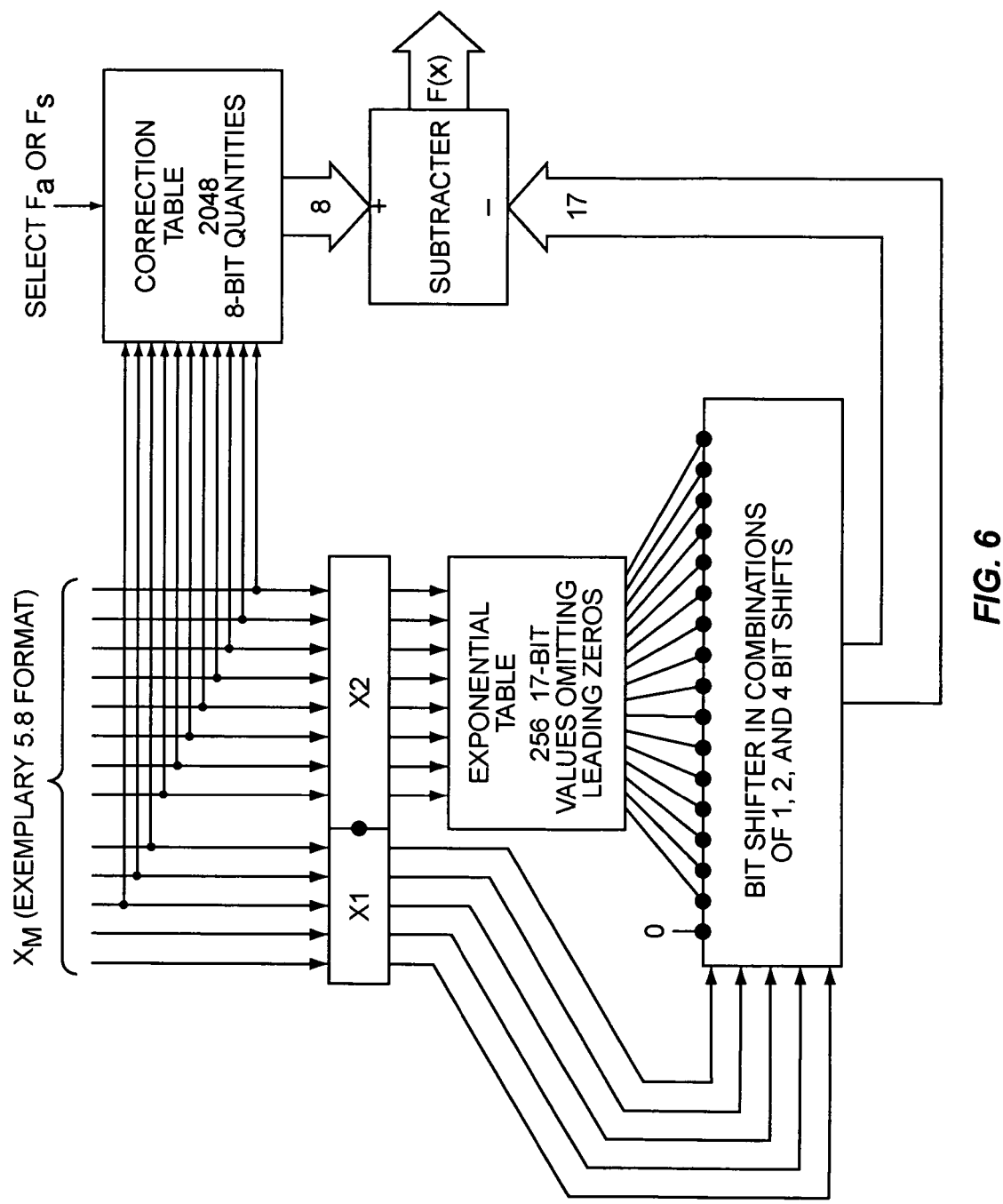
FIG. 6 illustrates a block diagram of a simplified F-table construction system.

FIG. 5 illustrates using the exponential approximation plus a correction table to implement the functions $F_a$ and $F_s$ over the entire range 0-24 of the argument. For approximating only $F_a$ over the range 8-16 however, the arrangement simplifies, as shown in FIG. 6.

Pipeline

While the various two-table iterative methods discussed above may be used to reduce the amount of memory required to perform logarithmic arithmetic, it will be appreciated that executing the multiple iterations required to produce the desired result consumes a significant amount of time. To reduce the time, and therefore, to speed up the logarithmic arithmetic process, the present invention describes an ALU that implements an inventive multi-stage pipeline of the hardware with feed-forward from one stage to the next. Because the look-up table for the F(r) function is addressed by successively larger r-values at each stage, the look-up table for each stage need only handle a range of addresses between the maximum r-value handled by the previous stage and the minimum r-value handled by the subsequent stage. In effect, a single look-up table F(r) may be decomposed into a plurality of simultaneously addressable sub-function look-up tables, each associated with a respective stage of the pipeline. Furthermore, as the value of F(r) diminishes as r increases, the wordlength of each successive table may be shorter. Because the silicon area Read Only Memory (ROM) occupied on a chip is proportional to the number of bits, and more particularly to the number of stored binary ones, leading zeros, and other zeros requiring no specific structure, the partitioning of the F(r) tables can reduce total silicon area.

As mentioned above, substantially all research into logarithmic ALUs concerns reducing table sizes. The optimization disclosed herein is an important contribution to achieving this goal. In this application, a multi-stage pipeline typically implements 3 or 4 stages of iteration, as required for convergence for real add and real subtract, respectively, or more stages as required for complex arithmetic, with sequentially-connected hardware optimized for each stage. In this way, the first stage of a new calculation may be started while later hardware stages handle the second and subsequent stages of earlier calculations. This increases the throughput from one arithmetic operation per three or four stage or cycle delays to one arithmetic operation per single-stage delay.

The above describes a two-table iterative process that uses three cycles to perform logarithmic addition, and four cycles to perform logarithmic subtraction. According to the inventive pipeline of the present invention, each stage implements one cycle. While each stage may comprise a complete set of F and G tables, the following describes ways to reduce the table sizes by decomposing the function used to derive the F look-up table into sub-functions that define sub-function look-up tables, where each stage has a corresponding sub-function look-up table.

In the above-described 3-cycle addition algorithm, the argument $X_M$ for the $F_a$ look-up table used in the first stage may be in the range of 0 to 24. However, if $X_M \geq 8$, the first stage may be skipped or bypassed, as two stages should be sufficient to increase X to the desired terminal value of greater than 24. In that case an argument of $F_a$ greater than 8 is first encountered at the second stage, so that the first stage may be restricted to dealing with values where $X_M < 8$, which reduces the size of the first stage's look-up table.

Similarly, if $X_M \geq 16$ at the second stage, the second stage may be skipped or bypassed as X is bound to exceed 24 after the 3rd stage alone. Thus, the first time an argument of $F_a$ greater than or equal to 16 is encountered is at the 3rd stage, and the stage-2 argument to $F_a$ may be limited to the range $8 \leq X_M < 16$.

The argument to $F_a$ in the 3rd stage will then be in the range 16 to 24 ($16 \leq X_M < 24$); for $X_M > 24$, $F_a = 0$, so no function value need be generated. It will be appreciated that the argument range of $X_M$ could equally have been partitioned into the ranges 0-9; 9-18; and >18. However, setting boundaries of 8, 16 and 24 makes the partitioning particularly easy, because only the two most significant bits of $X_M$ determine these boundaries, and the F-tables need only be addressed by 3-bits to the left of the binary point. This makes it clear why, if a base value of 8 is subtracted from the stored G-table values, it does not need to be added back as it does not affect these 3-bits.

Figure 7:
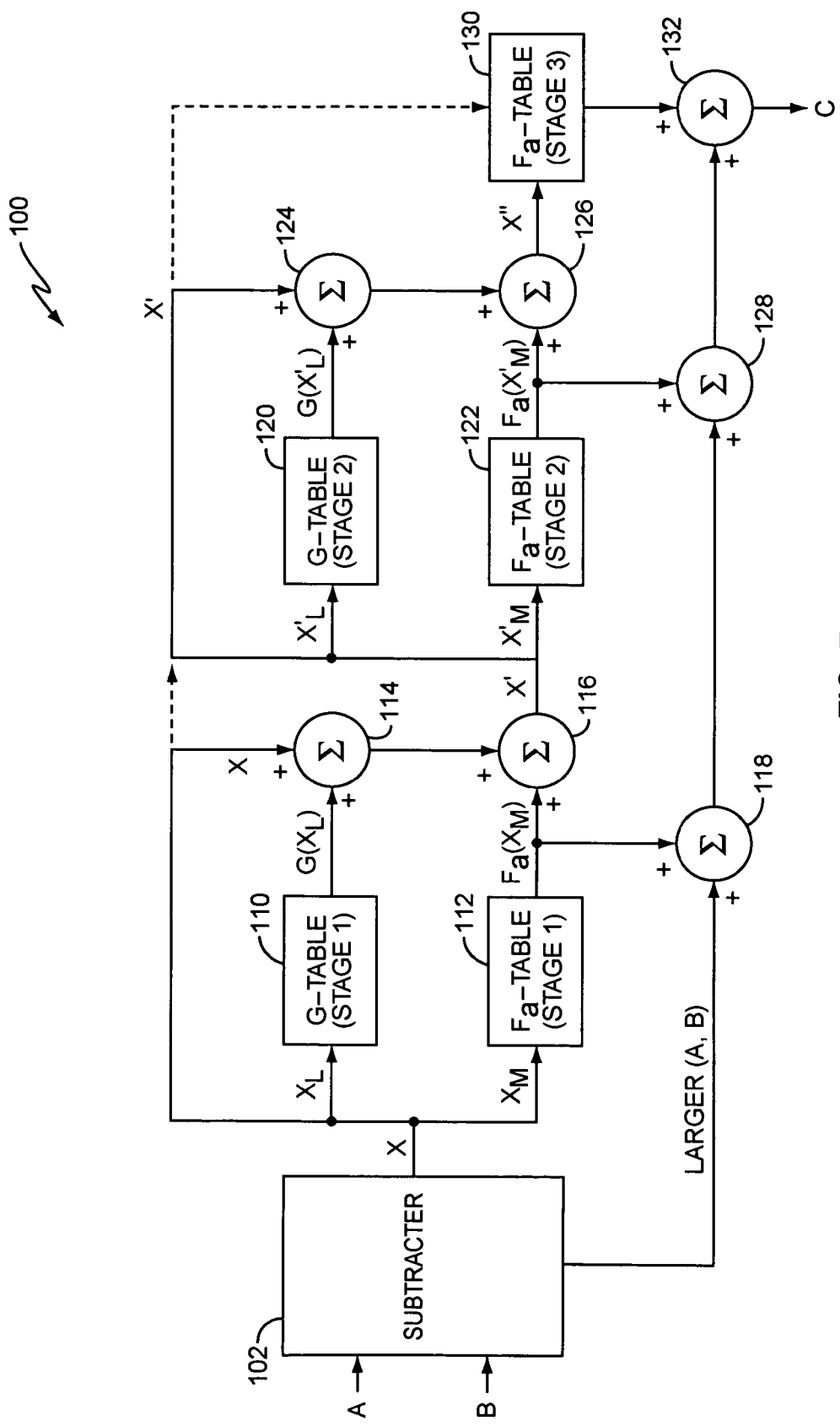
FIG. 7 illustrates one exemplary block diagram for a logadd multi-stage pipeline according to the present invention.

FIG. 7 shows one exemplary ALU 100 for implementing the multi-stage pipeline according to the present invention. ALU 100 comprises a subtracter 102, multiple pipeline stages, and one or more output combiners 118, 128, 132. Each stage includes a sub-function look-up table 112, 122, 130 derived from a decomposed master look-up table. As such, the size of the combination of the sub-function look-up tables approximates the size of the master look-up table. Subtracter 102 subtracts the two log-quantities, A and B, where $A = \log_q(a)$ and $B = \log_q(b)$, to generate X. Further, subtracter 102 outputs the larger to combiner 118 and the modulus of the difference to look-up tables 110, 112 and combiner 114. The most significant bits of the difference ($X_M$), in format (5.8) but of value less than 24, address $F_a$-table 112, while the least significant bits ($X_L$) address G-table 110. Combiner 118 combines the $F_a$-table output, herein referred to as a partial output, of form (0.24), with the larger of A and B. The G-table output may be of value up to just less than 24 (there is no need of higher values as that would terminate the computation) and is of form (5.24). Combiner 114 combines the G-table output with the previous value of X and the partial output from $F_a$-table 112 to obtain the next value of X, X'. Because the LSBs $X_L$ are stable out of subtracter 102 before the MSBs, the output of the G-table 110 is valid before the output of $F_a$-table 112. As such, the output of G-table 110 may be added to X first, as shown in FIG. 7. The result, which also need not be of greater wordlength than 5.24, is then added to the partial output provided by $F_a$-table 112. To avoid repeating that X>24 signifies the algorithm has converged, it may simply be noted that, if at any stage in the pipeline it is detected that the X-value is about to exceed 24, the process may be terminated and an early result extracted. Further, when the value of X input to a stage exceeds the maximum address value to the $F_a$-table, the output values of the $F_a$ and G tables may be forced to zero so that nothing is added to X nor to the larger of A and B. The unchanged values simply pass to the next stage upon the next clock cycle.

The output of combiner 116 is 29 bits of format (5.24). The most significant 13 bit (5.8) address sub-function table 122. The reason $F_a$-table 122 is a partial $F_a$-table is that the value of $X_M$ at this point is always greater than 8, as discussed above. To summarize, after the first stage, $X_M$ is always greater than 8 because:

The minimum starting value of $X_M$ is just greater than 0.
The value from the $F_a$-table 122 is then almost 1.
The minimum value from the G-table 120 is $-\log_2(1-2^{-8}) = 8.53$.

Therefore the minimum argument for sub-function table 122 is 9.5. It therefore only needs to provide values for $X_M$ between 9.5 and 24, which requires significantly fewer bits. However, providing for $X_M$ down to 8 gives a simpler way to determine to bypass stage 1 based on the two MS bits only. Combiner 128 combines the partial output from sub-function table 122 with the result so far.

The second G-table 120 may be identical to the first G-table 110, ignoring the 24th LSB of the output of combiner 116 and thus being addressed still with only 15 bits. On the other hand, if desired, the bit-split for the second stage need not be the same as that for the first stage. For example, given that the sub-function table 122 is substantially smaller, due to the F-value being of shorter wordlength, $X'_M$ could be one bit longer and $X'_L$ one bit shorter (or else the $24^{th}$ LSB could be used). The bit-split for the third stage could likewise be independently optimized, as discussed further below.

Combiner 124 combines the output of G-table 120 of format 5.24 with the 29-bit X' value, and combiner 126 combines the 29 bit result with the partial output from sub-function table 122 to obtain the next value of X, X". The most significant 13 bits (5.8) of X" address another sub-function table 130, which is even smaller than the sub-function table 122, as the X" value at this point is always greater than 18 (or 16), as discussed above. Thus, the $F_a$ values are only single-byte values in the third stage. Combiner 132 combines the partial output from final $F_a$-table 130 with the result from combiner 128 to produce the final result C, which is then rounded from S8.24 to S8.23.

In some situations, one or more stages of the pipeline may be bypassed, as discussed briefly above. For example, if X>8 in the first stage the first stage may be bypassed by feeding the values forward to the second stage and inserting them into the process. This may be done by simply adding zero to X and to the partial output, but still waiting for the next clock cycle, so that the calculation that is ahead one stage can propagate forward. Similarly, if X'>16 in the second stage, the second stage may be bypassed by feeding unmodified values forward to the third stage. In other words, when an input value for a particular stage exceeds the range of the stage's look-up tables, the stage may be bypassed by feeding the unmodified values forward, as indicated by the dotted lines in FIG. 7. Omitting a waiting period may only be done if the pipeline is not full, or if other steps are taken to avoid conflict, such as waiting for the values one step ahead to propagate. Thus, there is not necessarily any speed advantage in this bypass method if the pipeline is fully loaded. The initial $F_a$-table 112 may thus be limited to the range X=0 to 8, as values over 8 will be pushed ahead to $F_a$-table 122. In effect, $F_a$-table 112 is reduced by the size of $F_a$-table 122 and $F_a$-table 130 so that the sum of the sizes of the $F_a$-tables for pipelined LOGADD is substantially the same as the size of the master $F_a$-table used for the un-pipelined iteration. Only the G-table is duplicated in its entirety, assuming it is not fast enough to time-share.

There are different ways to implement the "bypass" or "push ahead" algorithm. It is often advisable in high speed logic to retime bit transitions from one stage to the next so as to avoid undue settling ripple, which can increase power consumption. The pipeline algorithm may be provided with retiming flip-flops between the first and second and/or between the second and third stages. Note that the retiming of the LSBs may take place earlier than the retiming of MSBs, and in general, bits of a word may be retimed with a deliberately stagger-delayed clock in order to match ripple-carry delay. In order to avoid violating the pipeline order, it may be arranged for the values always to propagate through all three retimed stages; however, if the X value at any stage is greater than that handled by its associated sub-function table, a "no-op" may be performed and the substantially unmodified X-value and partial output is passed on to the next stage after the appropriate retiming. A value of 8 may be subtracted from X when a stage is bypassed if a base value of 8 is subtracted from the G-table entries. This may also be achieved just by arranging the F and G tables to output zero values if the F-table argument is out-of-range for a particular stage's F-table. In this way, little or no overlap in the X-range handled by different sub-function F-tables is needed, so that the total number of bits required for the F-tables is no higher than the total number of bits required for the master F-table used in the un-pipelined algorithm. In some embodiments, the F-table for the last stage may use only the exponential approximation with no correction.

Figure 8:
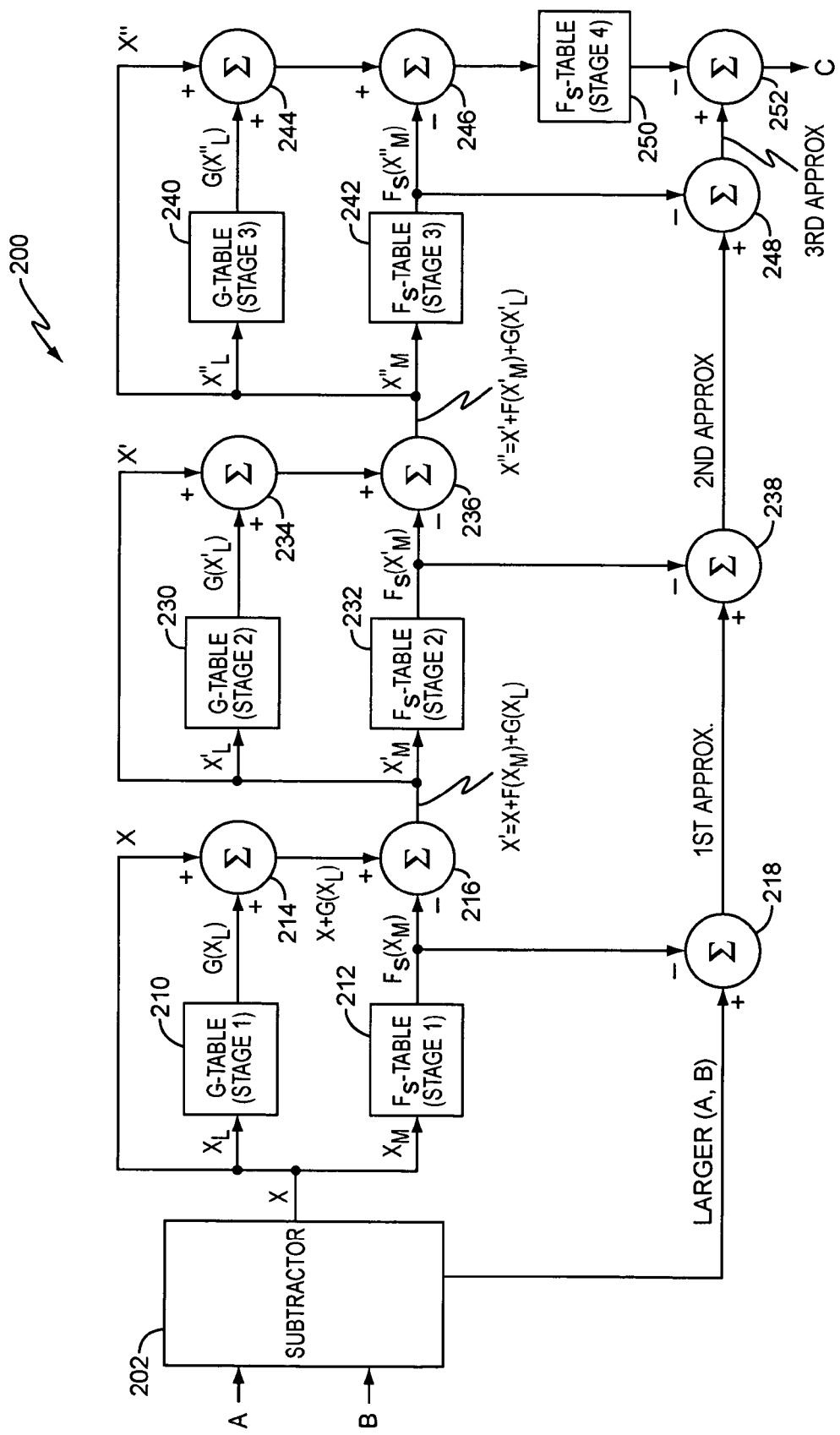
FIG. 8 illustrates one exemplary block diagram for a logsub multi-stage pipeline according to the present invention.

Logarithmic subtraction is substantially identical to the above-described logadd with use of a different function $F_s$, and takes typically one more iteration than addition to converge. FIG. 8 illustrates one exemplary ALU 200 for implementing the pipeline associated with the LOGSUB algorithm. Subtracter 202 subtracts the two log-values A and B. The input values are both assumed to have the same sign, else subtracting them would require use of the LOGADD algorithm instead. Input subtracter 202 determines the input value with the larger logmagnitude and determines the sign of the result, which is the opposite of the input signs if B has the larger logmagnitude or the same as the input signs if A has the larger logmagnitude. The result sign is the MSB of the 32-bit output, which remains unaffected through combiner chain 218, 238, 248, 252 to the output.

If the difference MSBs $X_M$ are zero, the value of $F_s(X)$ is given by $G(X_L)$ directly and the pipeline may be terminated early. Thus the minimum value of $X_M$ with which the $F_s$-table 212 of the first stage must deal is 00000.00000001. The value stored against that address is $-\log_2(1-2^{-0.000000011\ldots 1})$, however. This is subtracted from the G-table value (plus the previous value of X from combiner 214) in combiner 216 to produce an always positive result, X', greater than the previous value of X by at least the amount:

$$\log_2\left[\frac{1-2^{-(2^{-8}-2^{-23})}}{1-2^{-(2^{-7}-2^{-23})}}\right] = 0.99807.$$

To get this result, X must have been 0.00000000111111111111111 making X' at least 1.001977. Therefore $F_s$-table 232 only need deal with an argument from 1 to 24, as compared with $F_s$-table 212 that in principle must deal with the full range. However, by implementing the bypass principle explained above for pipelined LOGADD, if the initial X value is greater or equal to 1, the first stage of the pipeline can be bypassed and X submitted first to $F_s$-table 232; then $F_s$-table 212 only need deal with the range of $0 \leq X < 1$.

Once the X value in the pipeline is greater than 1, each successive X-value increases by almost the same amount (8.5) as in the LOGADD algorithm so successive $F_s$-tables have shorter wordlengths and store only the number of values corresponding to the range of X processed at each stage. Thus, it may be seen that in any event, the use of the bypass method allows the sum of the sizes of all the sub-function $F_s$-tables for the pipelined algorithms to be the same as the size of the master function F-table used for the non-pipelined system, although the G-tables have to be triplicated for LOGSUB and duplicated for LOGADD. In both the LOGADD and LOGSUB pipelined algorithms, the sub-function look-up tables for the last stage may hold values of the function for a non-incremented $X_M$ value in order to improve the accuracy of the result given that the number of iterations is truncated.

In the LOGSUB algorithm, the successive $F_s$-table outputs, herein referred to as partial outputs, are subtracted from the larger of A and B in subtracter chain 218, 228, 238, 252 unless one or more stages are bypassed as described above. The $F_s$-table output may comprise at least one more additional LSB than the desired precision, so that in the event four $F_s$-values, all of which have been rounded by ½ an LSB in the same direction are combined, the total rounding will be less than 1 LSB of the desired precision. The intermediate combiners 218, 228, and 238 operate with this wordlength extension while combiner 252 may truncate the result by rounding appropriately to the desired 31-bits plus sign.

As discussed above, the size of the F-tables for both the logadd and the logsub pipelines may vary in different stages of the pipeline based on the expected range of the F-function argument. However, it will also be appreciated that the sizes of the function and/or correction tables may be further optimized based on the bit-split applied to the stage input. In other words, the bit split may be optimized for one or more stages to optimize the size of the stored tables. For example, with an exemplary bit split between $X_M$ and $X_L$ of (5.8; 15), the $F_a$-function for stage 2 only requires approximately 2.3 kilobytes of look-up table while the G-function requires approximately 130.1 kbytes, which totals to ∞132.4 k of memory for stage 2. However, a different bit split that allocates more bits to $X_M$ and fewer to $X_L$ as shown in the following table may minimize the total amount of memory needed for stage 2.

| $X_M$ bits | $X_L$ bits | F-Function Bytes | G-Function Bytes | Total Bytes |
|---|---|---|---|---|
| 5.8 | 15 | 2,304 | 130,072 | 132,376 |
| 5.9 | 14 | 4,608 | 65,536 | 70,144 |
| 5.10 | 13 | 9,216 | 32,768 | 41,948 |
| 5.11 | 12 | 18,432 | 16,384 | 34,816 |
| 5.12 | 11 | 36,864 | 8,192 | 45,056 |

The above table indicates that the smallest stage 2 combined function and correction table size occurs with the bit split (5.11; 12). The actual memory chip area may be minimized further by omitting leading zeros for values shorter than the longest word (17-bits) in the function table and shorter than 8-bits in the correction table. Other means to reduce table sizes may also be used to achieve further reductions.

For $X_M$ between 0 and 8, it may be more efficient to employ a direct look-up table for $F_a$ than to employ the exponential approximation. The values to be stored for addition are less than 1.0 and may be stored to an accuracy of 24-bits after the point, in 0.24 format. The stage 1 instance of the functions for the argument range $0 \leq X_M < 8$ for $F_a$ may therefore be optimized in the same way as for stage 2. In this case it is assumed that a direct look-up table implements the $F_a$ function and that all words are three bytes long. Thus for stage 1, the optimum split is (5.10; 13), as shown by the following table.

| $X_M$ bits | $X_L$ bits | F-Function Bytes | G-Function Bytes | Total Bytes |
|---|---|---|---|---|
| 5.8 | 15 | 6,144 | 130,072 | 136,216 |
| 5.9 | 14 | 12,288 | 65,536 | 77,824 |
| 5.10 | 13 | 24,576 | 32,768 | 57,344 |
| 5.11 | 12 | 49,152 | 16,384 | 65,536 |

For the final stage (stage 3) of the addition algorithm, because no subsequent $X_M$ value is needed, no G-function need be computed. Furthermore, for the argument range $16 \leq X_M < 24$, the exponential approximation alone suffices and only the most significant bits of X are needed; for example the format 5.8 could be used and an exponential table of 256 bytes suffices.

Choosing the minimum totals for each stage, the total amount of table look-up required for the 3-stage pipeline is 57,344+34,816+256=92,416 bytes for a stage 1 split of (5.10; 13), a stage 2 split of (5.11; 12) and a stage 3 split of (5.8). This is an approximate indication of chip area only, as it has been pointed out that many values have several leading zeros which do not necessarily take up chip area if the ROM construction convention represents a "1" by the existence of a transistor and a "0" by the absence of a transistor.

It will also be appreciated that because only the first 8 binary places of X are needed in the last stage, the 24 places after the point for the preceding G-function in stage 2 are unnecessary. The size of the stage 2 G-table may thus be halved leading to the following size trade-off table for stage 2:

| $X_M$ bits | $X_L$ bits | F-Function Bytes | G-Function Bytes | Total Bytes |
|---|---|---|---|---|
| 5.8 | 15 | 6,144 | 65,536 | 71,680 |
| 5.9 | 14 | 12,288 | 32,768 | 45,056 |
| 5.10 | 13 | 24,576 | 16,384 | 40,960 |
| 5.11 | 12 | 49,152 | 8,192 | 57,344 |

The bit-split into $X_M$ and $X_L$ for the pipelined logsub algorithm may also be different for one or more stages of the pipeline to minimize the total size of the $F_s$ and G tables at each stage. The first stage $F_s$-table 212 of the subtracter pipeline 200 only need deal with values of $X_M$ from 0 to 1, so is zero to the left of the binary point. The value of the $F_s$ function may be up to 29 bits long (5.24) for this argument range, which is rounded up to 4 bytes. This results in the following trade-off table:

| $X_M$ bits | $X_L$ bits | F-Function Bytes | G-Function Bytes | Total Bytes |
|---|---|---|---|---|
| 0.10 | 13 | 4,096 | 32,768 | 36,864 |
| 0.11 | 12 | 8,192 | 16,384 | 24,576 |
| 0.12 | 11 | 16,384 | 8,192 | 24,576 |
| 0.13 | 10 | 32,768 | 4,096 | 36,684 |

The choice of a (12:11) bit split between $X_M$ and $X_L$ minimizes the total memory, and on average ensures a larger value of X' into the second stage of the pipeline than the 11:12 split.

The second stage $F_s$-table 232 of the subtracter pipeline 200 deals with X' values greater than 1 and less than 8, of the form 3.23. It may be convenient to allow the second stage to deal with values up to 9, so that a full power of 2 address space is used. The value of X' passed from the first stage can be reduced by 1 to present an address to the $F_s$-table 232 between 0 and 8, i.e. 3 bits to the left of the binary point. The value of the $F_s$ function is less than 1, so has 24 bits to the right of the point only, i.e. 3 bytes. This results in the following trade-off table:

| $X_M$ bits | $X_L$ bits | F-Function Bytes | G-Function Bytes | Total Bytes |
|---|---|---|---|---|
| 3.8 | 15 | 6,144 | 131,072 | 137,216 |
| 3.9 | 14 | 12,288 | 65,536 | 77,824 |
| 3.10 | 13 | 24,576 | 32,768 | 57,344 |
| 3.11 | 12 | 49,152 | 8,192 | 57,344 |
| 3.12 | 11 | 98,304 | 4,096 | 102,400 |

Thus, the (3.11:12) split is a good choice for the second pipeline stage.

The value of X" from the second pipeline stage will be greater than 11, but the third pipeline stage must also deal with values greater than 9 that bypass the second stage. Thus, the third stage sub-function tables must deal with a value of X" greater than 9 but less than 17. The value of the $F_s$ function is now shorter than 2 bytes. Furthermore, only the most significant part of X" need address the $F_s$-table in the last stage, so the G-function need only be stored to 2 bytes accuracy. The address to the 3rd stage $F_s$-table may be reduced by 9 to the range 0-8 again by subtracting 9, i.e. the address has 3 bits to the left of the point, resulting in the following trade-off table:

| $X_M$ bits | $X_L$ bits | F-Function Bytes | G-Function Bytes | Total Bytes |
|---|---|---|---|---|
| 3.8 | 15 | 4,096 | 65,536 | 69,632 |
| 3.9 | 14 | 8,192 | 32,768 | 40,960 |
| 3.10 | 13 | 16,384 | 16,384 | 32,768 |
| 3.11 | 12 | 32,768 | 8,192 | 40,960 |
| 3.12 | 11 | 65,536 | 4,096 | 69,632 |

From the above table, the best split (3.10:13) for stage 3 is apparent.

The $F_s$-table in the last stage deals with the remaining possible values of X greater than 17 and up to 25. The value of the function needs only 8 LSBs for its representation in this argument range, so the last stage's $F_s$-table need only be of the order of 2 to 4 kilobytes. Adding up the total look-up table requirements for the 4-stage pipeline logsub algorithm, we get 118,688 bytes, or approximately 120 kB, which is less than 10% of the silicon area of a typical modern digital integrated circuit chip.

While optimizing the bit split optimizes the size of the F and G tables, optimizing the bit split may also be useful when logadd and logsub are implemented separately for the pipelined approach, so as to perform complete real Butterfly operations. This allows logsub, which involves slightly different wordlengths, and needs one more stage of pipelining, to be optimized separately.

Even when adds and subtracts of the same value pair are not required, having separate logadd and logsub devices allows separate queues of value-pairs to be added and value-pairs to be subtracted to be processed simultaneously, which, with random data, would be expected to occur roughly 50% of the time each, thereby doubling processing speed. If a pipelined approach is implemented, it is likely due to the desire for maximum processing speed, so parallel execution of logadds and logsubs is likely to be welcomed.

The objective of pipelining is to increase throughput speed. To this end, it is useful to find ways to reduce propagation delay through the pipeline. Propagation delay occurs mainly in combiners due to the need to allow enough time for carry propagation from the least significant bit potentially all the way to the most significant bit. Various schemes for look-ahead carry generation are known in order to reduce this delay.

FIG. 7 shows that combiner 114 combines the difference value from subtracter 102 with the output of G-table 110, and that combiner 116 combines the output of combiner 114 with the output of $F_s$-table 112. However, the need to add the least significant part of X, $X_L$, to the least significant part of $G(X_L)$ may be avoided by simply storing a value $X_L+G(X_L)$ in G-table 110. Likewise, instead of adding the most significant part of X, $X_M$ to the G-table output in combiner 114, $X_M$ may equally well be combined at combiner 116. However, this can be avoided by simply storing the value of $X_M+F_a(X_M)$ in sub-function table 112. In this circumstance, because the output of sub-function table 112 is also used in combiner 118, it is necessary to compensate for the addition of $X_M$ by modifying the value of "LARGER(A, B)" output from subtracter 102. To that end, the most significant part of the smaller value is input into combiner 118. Also, a borrow from the least significant part of subtracter 102 is fed forward as a carry input to combiner 118.

The mathematical description of this is as follows. Let $(A_M, A_L)$ represent the most and least significant parts of A respectively. Let $(B_M, B_L)$ represent the most and least significant parts of B likewise. Further, assume that A>B. Then $X_L=A_L-B_L$ modulo its wordlength, and $X_M=A_M-B_M-b$, where b represents the borrow bit from the operation $A_L-B_L$. Then, the output from stage 1 and the input for stage 2 may be represented by:

$$X' = X + F(X_M) + G(X_L) \tag{33}$$
$$= (X_{M'}, X_L) + F(X_M) + G(X_L)$$
$$= [X_M + F(X_M)] + [X_L + G(X_L)]$$
$$= F^\#(X_M) + G^\#(X_L),$$

where the functions $F^\#$ and $G^\#$ have the addition of $X_M$ and $X_L$, respectively, already built in. X" may be calculated from X' likewise, and so forth. Thus, one combination per pipeline stage has been eliminated. The desired result for the LOGADD operation is:

$$A+F_a(X)+F_a(X')+F_a(X'')=(A_M,A_L)+F^\#(X_M)+F^\#(X'_M)+ \\ F^\#(X''_M)-(X_M+X'_M+X''_M) \tag{34}$$

Substituting $B_M+b$ for $A_M-X_M$ this may also be written:

$$A+F_a(X)+F_a(X')+F_a(X'')=(B_M+b,A_L)+F^\#(X_M)+F^\# \\ (X'_M)+F^\#(X''_M)-(X'_M+X''_M). \tag{35}$$

Because there is no X''' required, it is not necessary to use the $F^\#$ function for the last stage of the pipeline. Therefore, the last stage uses the regular $F_a$-function discussed above without the extra $X_M$" built in, resulting in:

$$A+F_a(X)+F_a(X')+F_a(X'')=(B_M+b,A_L)+F^{190}(X_M)+F^\# \\ (X'_M)+F_a(X''_M)-X'_M, \tag{36}$$

where $(X'_M, X'_L)=X'=F^\#(X_M)+G^\#(X_L)$ and $(X''_M, X''_L)= X''=F^\#(X'_M)+G^\#(X'_L)$. Further, as pointed out above, it is not necessary to compute $X''_L$, so the second G-table need only contain the most significant part of the G-value. The second stage sub-function look-up table is required to contain the least significant (LS) part of the $F_a$-value, however, as it contributes to the result of the logadd operation.

Figure 9:
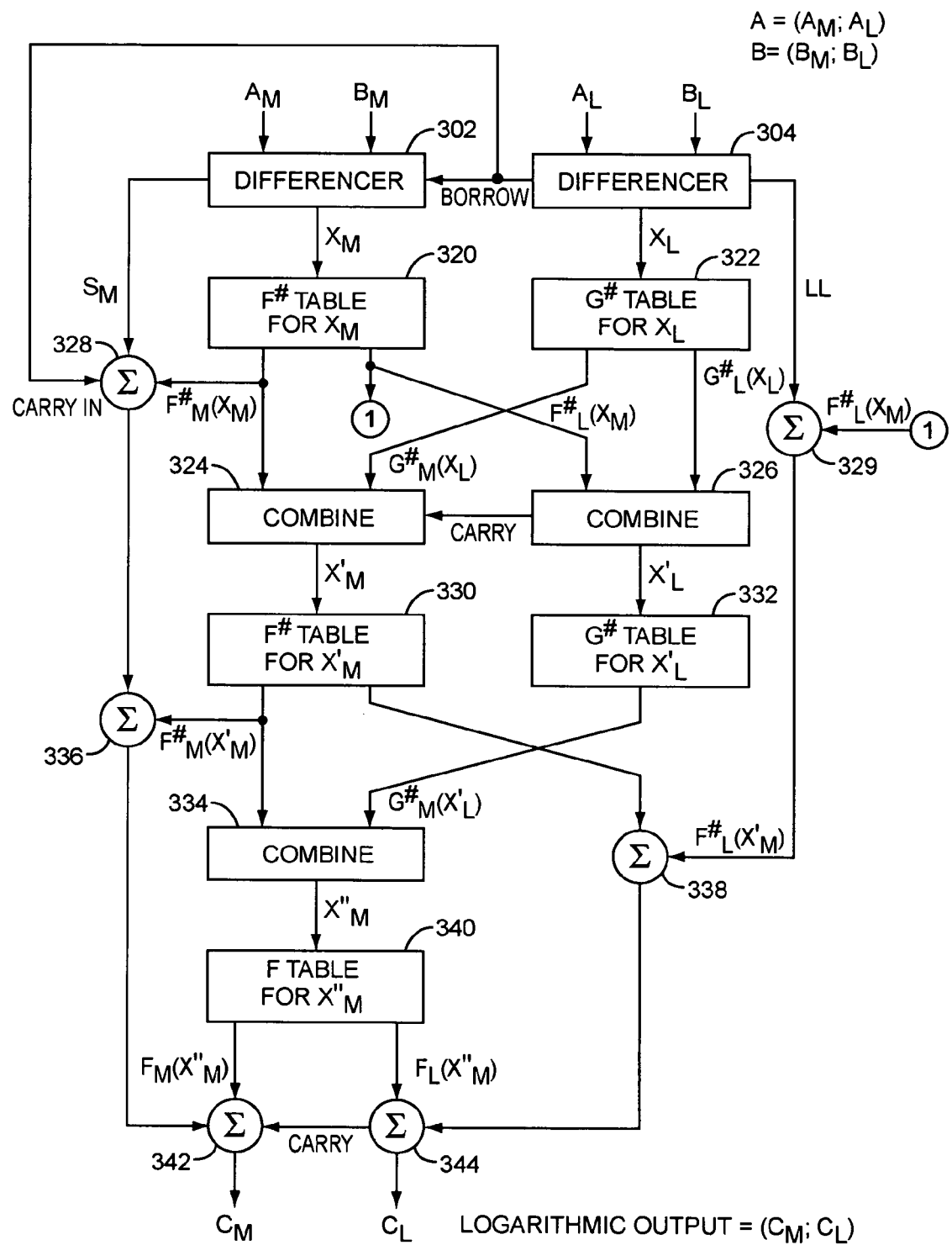
FIG. 9 illustrates one exemplary block diagram for a modified logadd multi-stage pipeline according to the present invention.

FIG. 9 illustrates one exemplary ALU 300 for implementing this arrangement. Subtracter 102 is now partitioned into a most significant part subtracter 302 and a least significant part subtracter 304. The difference output $X_M$, $X_L$ is the same as output in FIG. 7 from subtracter 102, namely A–B if A is the larger logmagnitude, else B–A. Also, the least significant part of A or B determined to be the larger is output as LL, which is also the same for subtracter 102 of FIG. 7. However, the value Sm output from the most significant part of subtracter 302 is now the most significant part of the smaller of A and B, which will effectively be modified to the most significant part of the larger due to the extra addition of $X_M$ into the partial output, $F^\#(X_M)$, to combiner 328. Also Sm should be incremented by 1 if $A_L-B_L$ generates a borrow while A is the larger or if $B_L-A_L$ generates a borrow while B is the larger. The increment by 1 may be achieved by applying a 1 to the carry input of combiner 328 when required.

$F^\#$-table 320 stores the value of the $F^\#$-function pre-added in its most significant bits with the table argument/address, $X_M$, and $G^\#$-table 322 likewise stores the value of the $G^\#$-function pre-added in its least significant bits with its own argument/address, $X_L$. Thus the value of X', is now computable with just one combiner as $F^\#(X_M)+G^\#(X_L)$ as the $F^\#$- and $G^\#$-tables have already combined the value with G and F. Combiners 324, 326 perform the required addition to generate X'. Thus the propagation delay, silicon area, and power consumption of one combiner has been eliminated.

This process continues into the second stage, where X' represents the stage 2 input. $F^\#$-table 330 and $G^\#$-table 332 provide new function and correction values based on $X'_M$ and $X'_L$, respectively. Combiner 334 combines the most significant bits of the function and correction output values to generate X". Combiner 338 combines the least significant bits of the partial output, $F^\#(X'_L)$, with the output of combiner 329 to generate a new estimate of the least significant output bits, while combiner 336 combines the most significant bits of the partial output, $F^\#(X'_M)$, with the output of combiner 328 to generate a new estimate of the most significant output bits.

Finally, in the third stage, X" is input into F-table 340 to generate the most significant and least significant bits of the function value based on X". Combiner 342 combines the most significant bits of the partial output, $F(X''_M)$, with the output of combiner 336 to generate a final estimate of the most significant output bits. Similarly, combiner 344 combines the least significant bits of the partial output, $F^\#(X''_L)$, with the output of combiner 338 to generate a final estimate of the least significant output bits.

The pipelined complex algorithm may be constructed the same way as the real LOGADD/SUB algorithms, although more stages may be needed for convergence, depending on the bit-split. However, as with the real algorithms, if the $\log_q(R)$ part of the argument of F at any stage exceeds its address range, that stage may be bypassed, thus keeping the sum of the sizes of the partial complex F-tables to the same total size as in the unpipelined algorithm.

It will be appreciated that the present invention may be used with memory compression techniques not explicitly addressed herein. For example, memory compression techniques discussed in U.S. Provisional Patent Application 60/577,386 and/or memory compression techniques discussed in U.S. patent application Ser. No. 11/143,157 may be used in conjunction with the invention of the present application.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of implementing logarithmic computations based on first and second operands in a multi-stage pipeline of a logarithmic ALU, said method comprising:
   decomposing a master look-up function associated with a master look-up table into two or more sub-functions;
   storing a sub-function look-up table in memory for each sub-function, each sub-function look-up table comprising a different portion of the master look-up table;
   dividing a range of input values associated with the master look-up table into a plurality of non-overlapping input range subsets, wherein each sub-function look-up table corresponds to a different input range subset;
   executing at least one sub-function look-up table in a respective stage of said multi-stage pipeline based on a stage input to obtain a stage output;
   skipping a stage when the stage input exceeds the corresponding input range subset; and
   combining the stage outputs to generate a logarithmic output.

2. The method of claim 1 wherein each stage input addresses the corresponding sub-function look-up table.

3. The method of claim 1 wherein the stage input comprises an MS portion and an LS portion, and wherein the MS portion of the stage input addresses the sub-function look-up table.

4. The method of claim 3 further comprising subtracting the first operand from the second operand to generate the stage input for a first stage of the multi-stage pipeline.

5. The method of claim 4 further comprising generating a stage input for a subsequent stage by accumulating the stage input and the stage output from a preceding stage with a correction value.

6. The method of claim 5 further comprising addressing a correction table stored in memory with the LS portion of the stage input to generate the correction value.

7. The method of claim 1 wherein implementing the logarithmic computations comprises determining the logarithm of the sum or difference of first and second values, wherein the first operand represents the logarithm of the first value and wherein the second operand represents the logarithm of the second value.

8. The method of claim 7 wherein combining the stage outputs to generate a logarithmic output comprises combining the stage outputs with one of the first and the second operands to generate the logarithmic output.

9. The method of claim 1 further comprising:
   dividing the first operand into MS and LS portions;
   dividing the second operand into MS and LS portions;
   subtracting the LS portions of the first and second operands to generate an LS portion of the stage input for a first stage of the pipeline; and
   subtracting the MS portions of the first and second operands to generate an MS portion of the stage input for a first stage of the pipeline.

10. The method of claim 9 wherein subtracting the LS portions of the first and second operands further generates a borrow portion, and wherein subtracting the MS portions of the first and second operands takes into account the borrow portion.

11. The method of claim 9 further comprising:
   generating the LS portion of the stage input for a subsequent stage by accumulating an LS portion of the stage output from a preceding stage with an LS correction value; and
   generating the MS portion of the stage input for a subsequent stage by accumulating an MS portion of the stage output from a preceding stage with an MS correction value.

12. The method of claim 11 wherein accumulating an LS portion of the stage output from the preceding stage with the LS correction value further generates a carry portion, and wherein generating the MS portion of the stage input for a subsequent stage comprises accumulating the carry portion with the MS portion of the stage output from a preceding stage and with the MS correction value.

13. The method of claim 11 further comprising addressing a modified correction table with the LS portion of the stage input to generate the MS correction value and the LS correction value.

14. The method of claim 11 wherein executing each sub-function comprises addressing the corresponding sub-function look-up table or a modified sub-function look-up table with the MS portion of the stage input to generate an MS portion of the stage output and an LS portion of the stage output.

15. The method of claim 14 wherein combining the stage outputs to generate the logarithmic output comprises:

combining the LS portion of the stage outputs with the LS portion of the second operand to generate an LS portion of the output;

combining the MS portion of the stage outputs with the MS portion of the first operand to generate an MS portion of the output; and joining the MS and LS portions of the output to generate the logarithmic output.

16. The method of claim 15 wherein combining the stage outputs comprises combining the MS portion of the first operand with the MS portion of at least one stage output taking account of said borrow portion.

17. The method of claim 15 wherein combining the LS portion of the stage outputs with the LS portion of the second operand further generates a carry portion, and wherein combining the MS portion of the stage outputs with the MS portion of the first operand includes combining the MS portion of the stage output with said carry portion.

18. The method of claim 1 wherein skipping a stage comprises generating a stage output equal to zero for the skipped stage, and using the stage input for the skipped stage as the stage input for a subsequent stage.

19. The method of claim 1 further comprising dividing the stage input for each stage into MS and LS portions.

20. The method of claim 19 wherein the MS and LS portions of the stage inputs may have different sizes for different stages.

21. The method of claim 1 wherein the size of at least one sub-function look-up table is based on the corresponding input range subset.

22. The method of claim 1 wherein the stored look-up table decreases in wordlength for at least two successive stages.

23. The method of claim 1 wherein one or more sub-function look-up tables have different sizes.

24. The method of claim 1 wherein the sub-function look-up tables from each stage together are equivalent to the master look-up table.

25. A logarithmic ALU to implement logarithmic computations based on first and second operands comprising:
   a multi-stage pipeline, wherein respective stages of the pipeline execute respective sub-functions of a decomposed master function to generate a stage output;
   memory to store a sub-function look-up table for each sub-function, each sub-function look-up table comprising a different portion of a master look-up table associated with the master function;
   wherein a range of input values associated with the master look-up table is divided into a plurality of non-overlapping input range subsets, wherein each sub-function look-up table corresponds to a different input range subset, and wherein the multi-stage pipeline generates a stage output equal to zero when the stage input exceeds the corresponding input range subset; and
   at least one combiner to generate a logarithmic output based on the stage output generated by each stage of the pipeline.

26. The logarithmic ALU of claim 25 wherein each stage input addresses the corresponding sub-function look-up table.

27. The logarithmic ALU of claim 26 wherein each stage input comprises an MS portion and an LS portion, and wherein the MS portion of each stage input addresses the corresponding sub-function look-up table.

28. The logarithmic ALU of claim 27 further comprising a subtracter to subtract the first operand from the second operand to generate the stage input for the first stage.

29. The logarithmic ALU of claim 28 wherein at least one stage of the multi-stage pipeline comprises a stage combiner to combine the stage input and stage output from a preceding stage with a correction value from the preceding stage to generate a stage input for a subsequent stage.

30. The logarithmic ALU of claim 29 wherein the memory further stores a correction table, and wherein the LS portion of the stage input addresses the correction table to generate the correction value for the corresponding stage.

31. The logarithmic ALU of claim 25 wherein the ALU implements the logarithmic computations by determining the logarithm of the sum or difference of first and second values, wherein the first operand represents the logarithm of the first value and wherein the second operand represents the logarithm of the second value.

32. The logarithmic ALU of claim 31 wherein the output combiner comprises two or more accumulators that accumulate the second operand with the stage outputs to generate the logarithmic output.

33. The logarithmic ALU of claim 25 further comprising a subtracter to subtract LS portions of the first and second operands to generate an LS portion of the stage input for the first stage, and to subtract MS portions of the first and second operands to generate an MS portion of the stage input for the first stage.

34. The logarithmic ALU of claim 33 wherein the subtracter further generates a borrow portion based on the subtraction of the LS portion of the first and second operands, and wherein the subtracter further takes into account the borrow portion when subtracting the MS portions of the first and second operands to generate the MS portion of the stage input for the first stage.

35. The logarithmic ALU of claim 34 wherein the at least one stage of the multi-stage pipeline comprises:
   an LS stage combiner to accumulate an LS portion of the stage output from a preceding stage with an LS correction value to generate an LS portion of a stage input for a subsequent stage; and
   an MS stage combiner to accumulate an MS portion of the stage output from a preceding stage with an MS correction value to generate an MS portion of a stage input for a subsequent stage.

36. The logarithmic ALU of claim 35 wherein the LS stage combiner further generates a carry portion based on the accumulation of the LS portion of the stage output from a preceding stage with the LS correction value, and wherein the MS stage combiner accumulates the carry portion with the MS portion of the stage output from the preceding stage and with the MS correction value to generate the MS portion of the subsequent input stage.

37. The logarithmic ALU of claim 36 wherein the memory further stores a modified correction table for at least one stage of the pipeline, wherein the LS portion of the stage input addresses the correction table to generate the correction value.

38. The logarithmic ALU of claim 36 wherein at least one sub-function look-up table stored in the memory comprises a modified sub-function look-up table.

39. The logarithmic ALU of claim 38 wherein the MS portion of the stage input addresses the sub-function look-up table or the modified sub-function look-up table to generate an MS portion of the stage output and an LS portion of the stage output.

40. The logarithmic ALU of claim 39 wherein at least one output combiner comprises:

an LS combiner to combine the LS portion of the stage outputs with the LS portion of the second operand to generate the LS portion of the logarithmic output; and an MS combiner configured to combine the MS portion of the stage outputs with the MS portion of the first operand to generate the MS portion of the logarithmic output.

41. The logarithmic ALU of claim 40 wherein said MS combiner combines the MS portion of the first operand with the MS portion of a stage output taking account of said borrow portion.

42. The logarithmic ALU of claim 40 wherein the LS combiner further generates a carry portion based on the combination of the LS portion of the stage output with the LS portion of the logarithmic output, and wherein the MS combiner is further configured to combine the MS portion of the stage output with the MS portion of the first operand and said carry portion to generate the MS portion of the logarithmic output.

43. The logarithmic ALU of claim 25 wherein the wordlength of each sub-function look-up table decreases in at least two successive stages.

44. The logarithmic ALU of claim 25 wherein the stage input comprises an MS portion and an LS portion, and wherein the MS and LS portions may have different sizes for different stages.

45. The logarithmic ALU of claim 25 wherein the size of at least one sub-function look-up table is based on the corresponding input range subset.

46. The logarithmic ALU of claim 25 wherein one or more sub-function look-up tables have different sizes.

47. The logarithmic ALU of claim 25 wherein the sub-function look-up tables from each stage together are equivalent to the master look-up table.

48. A method of implementing logarithmic computations in a multi-stage pipeline of a logarithmic ALU, said method comprising:

storing a sub-function look-up table for each stage of the multi-stage pipeline, wherein said sub-function look-up table comprising a different portion of a master function table;

dividing a range of input values associated with the master look-up table into a plurality of non-overlapping input range subsets, wherein each sub-function look-up table corresponds to a different input range subset;

computing a stage output for at least one stage using the corresponding sub-function look-up table and a stage input;

skipping a stage when the stage input exceeds the corresponding input range subset; and combining the stage outputs to generate a logarithmic output.

49. The method of claim 48 further comprising dividing the stage input for each stage into MS and LS portions.

50. The method of claim 49 wherein the MS and LS portions of the stage inputs may have different sizes for different stages.

51. The method of claim 48 wherein the size of at least one sub-function look-up table is based on the corresponding input range subset.

52. The method of claim 48 wherein one or more sub-function look-up tables have different sizes.

* * * * *

UNITED STATES PATENT AND TRADEMARK OFFICE
CERTIFICATE OF CORRECTION

PATENT NO.       : 7,711,764 B2                                     Page 1 of 3
APPLICATION NO.  : 11/142485
DATED            : May 4, 2010
INVENTOR(S)      : Dent It is certified that error appears in the above-identified patent and that said Letters Patent is hereby corrected as shown below:

In Fig. 4, Sheet 4 of 9, delete "E2" and insert -- $E_2$ --, therefor.

In Column 3, Line 34, in Equation (2), delete " $\log_q(1+q^{-rM^+}) + \log_q(1+q^{-r'M}_+) + \log_q(1+q^{-r''M^+})$ " and insert -- $\log_q(1+q^{-r_M^+}) + \log_q(1+q^{-r'_M^+}) + \log_q(1+q^{-r''_M^+})$ --, therefor.

In Column 3, Lines 39-40, in Equation (3), delete

" $r''=r'+\log_q(1+q^{-r'M^+}) - \log_q(1-q^{-r'L^-})$ $r'=r+\log_q(1+q^{-rM^+}) - \log_q(1q^{-rL^+})$ " and insert -- $r''=r'+\log_q(1+q^{-r'_M^+}) - \log_q(1-q^{-r'_L^-})$ $r'=r+\log_q(1+q^{-r_M^+}) - \log_q(1q^{-r_L^+})$ --, therefor.

In Column 3, Lines 43-45, in Equation (4), delete " $F'(r_M)=\log_q(1+q^{-rM^+})$ $G(r_L)-\log_q(1-q^{-rL^-})$ " and insert -- $F'(r_M)=\log_q(1+q^{-r_M^+})$ $G(r_L)-\log_q(1-q^{-r_L^-})$ --, therefor.

Signed and Sealed this

Twenty-third Day of November, 2010

David J. Kappos
*Director of the United States Patent and Trademark Office*

CERTIFICATE OF CORRECTION (continued)
U.S. Pat. No. 7,711,764 B2

In Column 6, Line 39, delete "$2^{xx}$" and insert -- $2^{-xx}$ --, therefor.

In Column 7, Line 52, delete "$2^{72^N}$," and insert -- $2^{\pm 2^N}$, --, therefor.

In Column 8, Line 29, delete "$\log_1(6)$" and insert -- $\log_{10}(6)$ --, therefor.

In Column 14, Line 1, delete "r=" and insert-- $r_L^- =$ --, therefor.

In Column 14, Line 18, delete "$r''=r'+\log_3(1+e^{-r'_M^+})-\log_e(1-e^{-r'_L^+})$." and insert -- $r''=r'+\log_e(1+e^{-r'_M^+})-\log_e(1-e^{-r_L^-})$. --, therefor.

In Column 15, Line 2, delete "$\log_e(1-e^{-r}{}_L^-)$" and insert -- $\log_e(1-e^{-r_L^-})$ --, therefor.

In Column 15, Line 35, delete "c=|a|-|b"." and insert-- c=|a|-|b|. --, therefor.

In Column 15, Line 64, delete "$\log_3(1-e^{-r_L^-})$." and insert -- $\log_e(1-e^{-r_L^-})$. --, therefor.

In Column 16, Line 15, delete "$r_M^+)$" and insert -- $r_M^+$ --, therefor.

In Column 17, Line 38, in Equation (28), delete "$\log_2(1+2_{-(X^{M+d})})$," and insert -- $\log_2(1+2^{-(X_M+d)})$, --, therefor.

In Column 17, Line 45, in Equation (29), delete "$-\log_2(1-2_{-(X^{M+d})})$" and insert -- $-\log_2(1-2^{-(X_M+d)})$ --, therefor.

In Column 17, Lines 52-53, in Equation (30), delete "$E = 2^{-X_{M1}} \cdot \left(\frac{2^{-0 \cdot X_{M2}}}{\log_e(2)}\right),$" and insert -- $E = 2^{-X_{M1}} \cdot \left(\frac{2^{-0 \cdot X_{M2}}}{\log_e(2)}\right),$ --, therefor.

CERTIFICATE OF CORRECTION (continued)
U.S. Pat. No. 7,711,764 B2

In Column 18, Line 9, delete "$dF_a$" and insert -- $dF_s$ --, therefor.

In Column 23, Line 6, delete "∞132.4" and insert -- ~132.4 --, therefor.

In Column 26, Line 10, in Equation (33), delete "$(X_{M'}, X_L)$" and insert -- $(X_M, X_L)$ --, therefor.

In Column 26, Line 33, in Equation (36), delete "$F^{190}$" and insert -- $F^{\#}$ --, therefor.